US011863519B2

(12) United States Patent
Zong et al.

(10) Patent No.: US 11,863,519 B2
(45) Date of Patent: Jan. 2, 2024

(54) COMMUNICATION METHOD AND APPARATUS FOR HANDLING DNS MESSAGES

(71) Applicant: Huawei Technologies Co., Ltd., Shenzhen (CN)

(72) Inventors: Zaifeng Zong, Nanjing (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/936,647

(22) Filed: Sep. 29, 2022

(65) Prior Publication Data

US 2023/0018917 A1 Jan. 19, 2023

Related U.S. Application Data

(63) Continuation of application No. PCT/CN2021/082591, filed on Mar. 24, 2021.

(30) Foreign Application Priority Data

Mar. 31, 2020 (CN) .......................... 202010246312.6
Oct. 23, 2020 (CN) .......................... 202011148899.3

(51) Int. Cl.
H04L 61/4511 (2022.01)
H04L 45/12 (2022.01)
H04L 61/256 (2022.01)

(52) U.S. Cl.
CPC ........ *H04L 61/4511* (2022.05); *H04L 45/126* (2013.01); *H04L 61/256* (2013.01)

(58) Field of Classification Search
CPC . H04L 61/4511; H04L 45/126; H04L 61/256; H04L 45/74; H04W 4/50
See application file for complete search history.

(56) References Cited

U.S. PATENT DOCUMENTS 9,088,415 B2 * 7/2015 Gagliano ................ H04L 9/321
11,611,475 B2 * 3/2023 Chou ..................... H04W 24/02
(Continued)

FOREIGN PATENT DOCUMENTS

| CN | 109729181 A | 5/2019 |
| CN | 110912835 A | 3/2020 |
| WO | 2019141169 A1 | 7/2019 |

OTHER PUBLICATIONS

3rd Generation Partnership Project; Technical Specification Group Services and System Aspects; 5G System Enhancements for Edge Computing; Stage 2 (Release 17), 3GPP TS 23.548, Sep. 2021, 59 Pages, V1.1.0.

(Continued)

*Primary Examiner* — Jimmy H Tran
(74) *Attorney, Agent, or Firm* — Slater Matsil, LLP

(57) ABSTRACT

A communication method and apparatus are provided. In the method, an SMF sends first information to a first user plane network element, where the first information indicates the first user plane network element to send a report message to the SMF when receiving a first DNS response message that meets a first condition, and the report message includes information about an application server indicated by the first DNS response message or information about a data network corresponding to the application server. The first user plane network element sends the report message to the SMF when determining that the received first DNS response message meets the first condition. The SMF inserts the local session anchor based on the report message.

21 Claims, 10 Drawing Sheets

(56) References Cited

U.S. PATENT DOCUMENTS

| | | | | |
|---|---|---|---|---|
| 2012/0258777 | A1* | 10/2012 | Huang | H04W 4/60 709/204 |
| 2013/0208591 | A1* | 8/2013 | Larsen | H04L 63/105 370/230 |
| 2015/0350343 | A1* | 12/2015 | Ludwig | H04L 41/0893 709/226 |
| 2016/0119157 | A1* | 4/2016 | Hua | H04L 69/16 370/312 |
| 2018/0062917 | A1* | 3/2018 | Chandrashekhar | H04L 63/0428 |
| 2018/0192471 | A1* | 7/2018 | Li | H04W 4/50 |
| 2018/0227743 | A1* | 8/2018 | Faccin | H04W 8/08 |
| 2019/0007500 | A1* | 1/2019 | Kim | H04L 67/141 |
| 2019/0053117 | A1* | 2/2019 | Bae | H04W 76/30 |
| 2019/0274185 | A1 | 9/2019 | Stojanovski et al. | |
| 2019/0350016 | A1* | 11/2019 | Hu | H04L 61/5007 |
| 2020/0015137 | A1* | 1/2020 | Stojanovski | H04W 76/15 |
| 2020/0053803 | A1* | 2/2020 | Youn | H04L 67/148 |
| 2020/0112848 | A1* | 4/2020 | Palaniappan | H04W 76/16 |
| 2020/0120570 | A1* | 4/2020 | Youn | H04W 76/11 |
| 2020/0336947 | A1* | 10/2020 | Lee | H04W 36/38 |
| 2020/0336949 | A1* | 10/2020 | Lee | H04W 36/0011 |
| 2021/0007166 | A1* | 1/2021 | Liao | H04W 48/16 |
| 2021/0051761 | A1* | 2/2021 | Kahn | H04W 80/10 |
| 2021/0136854 | A1* | 5/2021 | Kuge | H04W 76/19 |
| 2021/0168125 | A1* | 6/2021 | Vemulpali | H04L 9/0825 |
| 2021/0168142 | A1* | 6/2021 | Foxhoven | H04L 63/0884 |
| 2021/0168584 | A1* | 6/2021 | Li | H04W 60/00 |
| 2021/0243170 | A1* | 8/2021 | Puente Pestaña | H04W 8/18 |
| 2021/0385716 | A1* | 12/2021 | Bae | H04W 36/165 |
| 2021/0392561 | A1* | 12/2021 | Liang | H04L 45/02 |
| 2022/0046484 | A1* | 2/2022 | Örtenblad | H04L 67/63 |
| 2022/0247678 | A1* | 8/2022 | Atwal | H04L 63/0428 |
| 2022/0337553 | A1* | 10/2022 | Mayya | H04L 49/35 |
| 2022/0345442 | A1* | 10/2022 | Lee | H04L 61/4511 |
| 2022/0360977 | A1* | 11/2022 | Kim | H04W 36/12 |
| 2022/0377046 | A1* | 11/2022 | Zhang | H04L 67/51 |
| 2022/0394088 | A1* | 12/2022 | Salkintzis | H04L 67/1036 |
| 2022/0408333 | A1* | 12/2022 | Ryu | H04W 28/08 |
| 2023/0015916 | A1* | 1/2023 | Ryu | H04L 43/0858 |
| 2023/0028216 | A1* | 1/2023 | Tang | H04W 76/11 |
| 2023/0032185 | A1* | 2/2023 | Lee | H04W 8/20 |
| 2023/0079126 | A1* | 3/2023 | Mas Rosique | H04L 41/5003 |
| 2023/0239958 | A1* | 7/2023 | Li | H04L 45/74 370/328 |

OTHER PUBLICATIONS

3rd Generation Partnership Project; Technical Specification Group Services amd System Aspects; Study on enhancement of Support for Edge Computing in 5G Core network (5GC) (Release 17), 3GPP TR 23.748, Oct. 2020, 243 Pages, V1.1.0.

Orange et al., "PDU session anchor terminology clarification", 3GPP TSG-SA2 Meeting #136, S2-1912774, Nov. 18-22, 2019, 8 Pages, Reno, Nevada, USA.

Huawei et al., "EAS Discovery for Session Breakout connectivity model", 3GPP TSG-WG SA2 Meeting #143E e-meeting, S2-2100116, Feb. 24-Mar. 9, 2021, 9 Pages, Elbonia.

Huawei et al., "Further clarification related to EAS Discovery with EASDF", 3DPP TSG-SA WG2 Meeting #144E, S2-2102566, Apr. 12-16, 2021, 7 Pages, Elbonia.

Huawei et al., "Node Level DNS handling information on EASDF", 3GPP TSG-WG SA2 Meeting #146E e-meeting, S2-2106034, Aug. 16-27, 2021, 9 Pages, Elbonia.

3rd Generation Partnership Project; Technical Specification Group Services and System Aspects, System architecture for the 5G System (5GS); Stage 2 (Release 17), 3GPP TS 23.501, Jun. 2021, 526 Pages, V17.1.1.

* cited by examiner

COMMUNICATION METHOD AND APPARATUS FOR HANDLING DNS MESSAGES

CROSS-REFERENCE TO RELATED APPLICATIONS

This application is a continuation of International Application No. PCT/CN2021/082591, filed on Mar. 24, 2021, which claims priority to Chinese Patent Application No. 202010246312.6, filed on Mar. 31, 2020 and Chinese Patent Application No. 202011148899.3, filed on Oct. 23, 2020. All of the aforementioned patent applications are hereby incorporated by reference in their entireties.

TECHNICAL FIELD

This application relates to the field of communication technologies, and in particular, to a communication method and apparatus.

BACKGROUND

Currently, there is only one user plane network element (UPF) in a 5th generation (5G) network architecture in R15. Based on the network architecture, 5G further supports insertion of a plurality of session anchor UPFs on a user plane path of a protocol data unit (PDU) session, to support a connection to a local data network (DN), so that a terminal device can access a nearest application in the local DN. For example, the plurality of introduced UPFs may include an uplink classifier (ULCL)/branching point (BP) and at least one session anchor (PSA). The ULCL/BP distributes, to a corresponding PSA according to a distribution rule, an uplink data packet received from the terminal device, and sends, to the terminal device, a data packet received from the at least one PSA. Some PSAs may be connected to a DN located in a central data center (DC), and some PSAs may be connected to a DN located in a local DC (namely, a mobile edge computing or multiaccess edge computing (MEC)). When a UPF connected to the local DN exists at a location of the terminal device, an SMF may use the UPF as a local PSA, and insert the UPF into a PDU session path, so that the terminal device can access a nearest application server in the local DN.

However, a same application server may be deployed in the central DC and the local DC. There is no good implementation method for how to select an application server for the terminal device, so that a path between the terminal device and the application server is the shortest.

SUMMARY

This application provides a communication method and apparatus, to trigger insertion of a local session anchor. In this way, an application server near an access point of a terminal device is selected, so that a path between the terminal device and the application server is short.

According to a first aspect, this application provides a communication method. The method may include: A session management network element (SMF) sends first information to a first user plane network element, where the first information indicates the first user plane network element to send a report message to the SMF when receiving a first domain name server (DNS) response message that meets a first condition, and the report message includes information about an application server indicated by the first DNS response message or information about a data network corresponding to the application server. The SMF inserts a local session anchor based on the report message.

According to the foregoing method, in a process of discovering the application server, insertion of the local session anchor can be triggered by using the first condition. Therefore, an application server near an access point of a terminal device is selected, so that a path between the terminal device and the application server is short.

In a possible design, the first information further includes an address range of a data network where the report message needs to be sent, and the first condition may be that an internet protocol IP address of the application server indicated by the first DNS response message belongs to the address range. Alternatively, the first information further indicates information about an anycast address where the report message needs to be sent, and the first condition may be that an address of the application server indicated by the first DNS response message is included in the information about the anycast address. In this way, the first UPF can accurately determine whether the first DNS response message meets the first condition, and then send the report message to the SMF when the first DNS response message meets the first condition.

In a possible design, the report message is the first DNS response message, or the report message includes the first DNS response message. In this way, the first user plane network element does not need to buffer the first DNS response message, and may forward the first DNS response message to the SMF as the report message.

In a possible design, the first information further indicates the first user plane network element to buffer the first DNS response message. In this way, after the SMF subsequently inserts the local session anchor, the first user plane network element may send a corresponding DNS response message to the terminal device based on the buffered first DNS response message.

In a possible design, the SMF sends third information to the first user plane network element after inserting the local session anchor, where the third information indicates the first user plane network element to send a second DNS response message to the terminal device. The second DNS response message indicates a target application server selected for the terminal device, and the second DNS response message is the first DNS response message, or the second DNS response message is determined based on the first DNS response message. In this way, the first user plane network element can send the second DNS response message to the terminal device based on the buffered first DNS response message, to notify the terminal device of the target application server.

In a possible design, the SMF sends a third DNS response message to the terminal device after inserting the local session anchor, where the third DNS response message indicates a target application server selected for the terminal device, and the third DNS response message is the first DNS response message, or the third DNS response message is determined based on the first DNS response message. In this way, the SMF may directly notify the terminal device of the target application server.

In a possible design, the SMF sends second information to the first user plane network element. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform network address translation (NAT) according to a NAT protocol). The access information of the terminal device is used by the first user plane network element to select the application server for the terminal device. The information about the application server is included in the first DNS response message. In this way, the first user plane network element can subsequently select the application server based on the access information.

In a possible design, the SMF obtains an IP address and an optional port number that are reserved for the terminal device and that are used for network address translation NAT translation according to a NAT protocol. The second information further includes the IP address and the optional port number that are used for NAT translation.

In a possible design, the report message further includes the IP address and the optional port number that are used for NAT translation.

In a possible design, before sending the second information to the first user plane network element, the SMF obtains location information of the terminal device from a network element that implements an access and mobility management function (AMF), and determines the access information of the terminal device based on the location information of the terminal device. In this way, the access information of the terminal device can be accurately obtained.

In a possible design, the second information further indicates priorities of the access information of the terminal device, so that the first user plane network element selects the application server for the terminal device based on the priorities of the access information of the terminal device.

In a possible design, that the SMF inserts a local session anchor based on the report message may be specifically: The SMF determines, based on the information about the application server, a DNAI of the data network in which the application server is located, to determine the to-be-inserted local session anchor. Alternatively, the SMF determines the to-be-inserted local session anchor based on a DNAI corresponding to the information about the data network. In this way, the SMF can accurately determine the local session anchor, and then insert the local session anchor.

In a possible design, when the report message includes information about a plurality of application servers, the SMF determines a target application server, where the third information includes an address of the target application server. In this way, the first user plane network element can determine the second DNS response message based on the address of the target application server in the third information, to notify the terminal device of the target application server.

In a possible design, the SMF obtains routing information of the anycast address. The routing information of the anycast address includes information about at least one network element that implements a user plane function and corresponds to the anycast address, or a DNAI of a data network corresponding to the anycast address. The SMF determines the local session anchor based on access information of the terminal device and the routing information of the anycast address. In this way, the SMF can accurately determine the local session anchor, and then insert the local session anchor.

According to a second aspect, this application provides a communication method. The method may include: A first user plane network element receives first information from an SMF, where the first information indicates the first user plane network element to send a report message to the SMF when receiving a first domain name server DNS response message that meets a first condition, and the report message includes information about an application server indicated by the first DNS response message or information about a data network corresponding to the application server. The first user plane network element sends the report message to the SMF when determining that the received first DNS response message meets the first condition.

According to the foregoing method, in a process of discovering the application server, insertion of a local session anchor can be triggered by using the first condition. Therefore, an application server near an access point of a terminal device is selected, so that a path between the terminal device and the application server is short.

In a possible design, the first information further includes an address range of a data network where the report message needs to be sent, and the first condition may be that an internet protocol IP address of the application server indicated by the first DNS response message belongs to the address range. Alternatively, the first information further indicates information about an anycast address where the report message needs to be sent, and the first condition may be that an address of the application server indicated by the first DNS response message is included in the information about the anycast address. In this way, the first UPF can accurately determine whether the first DNS response message meets the first condition, and then send the report message to the SMF when the first DNS response message meets the first condition.

In a possible design, the report message is the first DNS response message, or the report message includes the first DNS response message. In this way, the first user plane network element does not need to buffer the first DNS response message, and may forward the first DNS response message to the SMF as the report message.

In a possible design, the first information further indicates the first user plane network element to buffer the first DNS response message. In this way, after the SMF subsequently inserts the local session anchor, the first user plane network element may send a corresponding DNS response message to the terminal device based on the buffered first DNS response message.

In a possible design, the first user plane network element receives third information from the SMF, where the third information indicates the first user plane network element to send a second DNS response message to the terminal device. The first user plane network element sends the second DNS response message to the terminal device. The second DNS response message indicates a target application server selected for the terminal device, and the second DNS response message is the first DNS response message, or the first DNS response message is determined based on the second DNS response message. In this way, the first user plane network element can send the second DNS response message to the terminal device based on the buffered first DNS response message, to notify the terminal device of the target application server.

In a possible design, the first user plane network element receives second information from the SMF. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message. In this way, the first user plane network element can subsequently select the application server based on the access information.

In a possible design, the second information may further include an IP address and an optional port number that are reserved for the terminal device and that are used for NAT translation.

In a possible design, the report message further includes the IP address and the optional port number that are used for NAT translation.

In a possible design, the second information further indicates priorities of the access information of the terminal device, so that the first user plane network element selects the application server for the terminal device based on the priorities of the access information of the terminal device.

In a possible design, the first user plane network element adds the access information of the terminal device to a DNS request message received from the terminal device, to obtain a new DNS request message. Alternatively, the first user plane network element determines a DNS server corresponding to the access information of the terminal device, and sends the DNS request message to the DNS server corresponding to the access information of the terminal device. In this way, the first user plane network element can accurately forward the DNS request message corresponding to the access information of the terminal device.

In a possible design, the access information of the terminal device is a plurality of pieces of access information. In this case, that the first user plane network element adds the access information of the terminal device to a DNS request message received from the terminal device, to obtain a new DNS request message may be specifically: The first user plane network element adds each piece of access information to the DNS request message, to obtain a plurality of new DNS request messages. Alternatively, the first user plane network element adds the plurality of pieces of access information to the DNS request message, to obtain the new DNS request message. In this way, the DNS request message corresponding to the access information of the terminal device can be accurately forwarded.

In a possible design, the access information of the terminal device is a plurality of pieces of access information. In this case, that the first user plane network element determines a DNS server corresponding to the access information of the terminal device, and sends the DNS request message to the DNS server corresponding to the access information of the terminal device may be specifically: The first user plane network element determines a DNS server corresponding to each of the plurality of pieces of access information, and sends the DNS request message to a DNS server corresponding to each piece of access information. In this way, the DNS request message corresponding to the access information of the terminal device can be accurately forwarded.

In a possible design, when obtaining information about a plurality of application servers, the first user plane network element determines a target application server based on priorities of access information of access networks corresponding to the plurality of application servers. The report message further includes information about the target application server or access network information corresponding to the target application server. In this way, the SMF may directly notify the terminal device of the target application server.

In a possible design, the third information includes an address of the target application server. The second DNS response message includes the address of the target application server. In this way, the first user plane network element can determine the second DNS response message based on the address of the target application server in the third information, to notify the terminal device of the target application server.

In a possible design, the first user plane network element buffers the first DNS response message when sending the report message to the SMF. In this way, after the SMF subsequently inserts the local session anchor, the first user plane network element may send a corresponding DNS response message to the terminal device based on the buffered first DNS response message.

According to a third aspect, this application provides a communication method. The method may include: An SMF sends first information to a first user plane network element, where the first information indicates the first user plane network element to send a report message to the SMF when receiving a first DNS response message that meets a first condition, and the report message includes information about an application server indicated by the first DNS response message or information about a data network corresponding to the application server. The first user plane network element sends the report message to the SMF when determining that the received first DNS response message meets the first condition. The SMF inserts a local session anchor based on the report message.

According to the foregoing method, in a process of discovering the application server, insertion of the local session anchor can be triggered by using the first condition. Therefore, an application server near an access point of a terminal device is selected, so that a path between the terminal device and the application server is short.

In a possible design, the first information further includes an address range of a data network where the report message needs to be sent, and the first condition may be that an internet protocol IP address of the application server indicated by the first DNS response message belongs to the address range. Alternatively, the first information further indicates information about an anycast address where the report message needs to be sent, and the first condition may be that an address of the application server indicated by the first DNS response message is included in the information about the anycast address. In this way, the first UPF can accurately determine whether the first DNS response message meets the first condition, and then send the report message to the SMF when the first DNS response message meets the first condition.

In a possible design, the report message is the first DNS response message, or the report message includes the first DNS response message. In this way, the first user plane network element does not need to buffer the first DNS response message, and may forward the first DNS response message to the SMF as the report message.

In a possible design, the first information further indicates the first user plane network element to buffer the first DNS response message. In this way, after the SMF subsequently inserts the local session anchor, the first user plane network element may send a corresponding DNS response message to the terminal device based on the buffered first DNS response message.

In a possible design, the first user plane network element buffers the first DNS response message when sending the report message to the SMF. In this way, after the SMF subsequently inserts the local session anchor, the first user plane network element may send a corresponding DNS response message to the terminal device based on the buffered first DNS response message.

In a possible design, the SMF sends third information to the first user plane network element after inserting the local session anchor, where the third information indicates the first user plane network element to send a second DNS response message to the terminal device. The first user plane network element sends the second DNS response message to the terminal device. The second DNS response message indicates a target application server selected for the terminal device, and the second DNS response message is the first DNS response message, or the second DNS response message is determined based on the first DNS response message. In this way, the first user plane network element can send the second DNS response message to the terminal device based on the buffered first DNS response message, to notify the terminal device of the target application server.

In a possible design, the SMF sends a third DNS response message to the terminal device after inserting the local session anchor, where the third DNS response message indicates a target application server selected for the terminal device, and the third DNS response message is the first DNS response message, or the third DNS response message is determined based on the first DNS response message. In this way, the SMF may directly notify the terminal device of the target application server.

In a possible design, the SMF sends second information to the first user plane network element. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message. In this way, the first user plane network element can subsequently select the application server based on the access information.

In a possible design, before sending the second information to the first user plane network element, the SMF obtains location information of the terminal device from an AMF, and determines the access information of the terminal device based on the location information of the terminal device. In this way, the access information of the terminal device can be accurately obtained.

In a possible design, the second information further indicates priorities of the access information of the terminal device, so that the first user plane network element selects the application server for the terminal device based on the priorities of the access information of the terminal device.

In a possible design, the first user plane network element adds the access information of the terminal device to a DNS request message received from the terminal device, to obtain a new DNS request message. Alternatively, the first user plane network element determines a DNS server corresponding to the access information of the terminal device, and sends the DNS request message to the DNS server corresponding to the access information of the terminal device. In this way, the first user plane network element can accurately forward the DNS request message corresponding to the access information of the terminal device.

In a possible design, the access information of the terminal device is a plurality of pieces of access information. In this case, that the first user plane network element adds the access information of the terminal device to a DNS request message received from the terminal device, to obtain a new DNS request message may be specifically: The first user plane network element adds each piece of access information to the DNS request message, to obtain a plurality of new DNS request messages. Alternatively, the first user plane network element adds the plurality of pieces of access information to the DNS request message, to obtain the new DNS request message. In this way, the DNS request message corresponding to the access information of the terminal device can be accurately forwarded.

In a possible design, the access information of the terminal device is a plurality of pieces of access information. In this case, that the first user plane network element determines a DNS server corresponding to the access information of the terminal device, and sends the DNS request message to the DNS server corresponding to the access information of the terminal device may be specifically: The first user plane network element determines a DNS server corresponding to each of the plurality of pieces of access information, and sends the DNS request message to a DNS server corresponding to each piece of access information. In this way, the DNS request message corresponding to the access information of the terminal device can be accurately forwarded.

In a possible design, when obtaining information about a plurality of application servers, the first user plane network element determines a target application server based on priorities of access information of access networks corresponding to the plurality of application servers. The report message further includes information about the target application server or access network information corresponding to the target application server. In this way, the SMF may directly notify the terminal device of the target application server.

In a possible design, that the SMF inserts a local session anchor based on the report message may be specifically: The SMF determines, based on the information about the application server, a DNAI of the data network in which the application server is located, to determine the to-be-inserted local session anchor. Alternatively, the SMF determines the to-be-inserted local session anchor based on a DNAI corresponding to the information about the data network. In this way, the SMF can accurately determine the local session anchor, and then insert the local session anchor.

In a possible design, when the report message includes information about a plurality of application servers, the SMF determines a target application server, where the third information includes an address of the target application server. The second DNS response message includes the address of the target application server. In this way, the first user plane network element can determine the second DNS response message based on the address of the target application server in the third information, to notify the terminal device of the target application server.

In a possible design, the SMF obtains routing information of the anycast address. The routing information of the anycast address includes information about at least one network element that implements a user plane function and that corresponds to the anycast address, or a DNAI of a data network corresponding to the anycast address. The SMF determines the local session anchor based on access information of the terminal device and the routing information of the anycast address. In this way, the SMF can accurately determine the local session anchor, and then insert the local session anchor.

According to a fourth aspect, this application further provides a communication apparatus. The communication apparatus may be an SMF. The communication apparatus is configured to implement a function of the SMF in the first aspect or the possible design examples of the first aspect, or the third aspect or the possible design examples of the third aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform a corresponding function of the SMF in the first aspect or the possible design examples of the first aspect, or the third aspect or the possible design examples of the third aspect. For details, refer to the detailed descriptions in the method example. Details are not described herein again.

In a possible design, a structure of the communication apparatus includes a transceiver and a processor, and optionally further includes a memory. The transceiver is configured to send and receive information or data, and is configured to communicate and interact with another device in a communication system. The processor is configured to support the communication apparatus in performing a corresponding function of the SMF in the first aspect or the possible design examples of the first aspect, or the third aspect or the possible design examples of the third aspect. The memory is coupled to the processor, and stores program instructions and data that are necessary for the communication apparatus.

According to a fifth aspect, this application further provides a communication apparatus. The communication apparatus may be a first user plane network element. The communication apparatus is configured to implement a function of the first user plane network element in the second aspect or the possible design examples of the second aspect, or the third aspect or the possible design examples of the third aspect. The function may be implemented by hardware, or may be implemented by hardware executing corresponding software. The hardware or the software includes one or more modules corresponding to the foregoing function.

In a possible design, a structure of the communication apparatus includes a transceiver unit and a processing unit. These units may perform a corresponding function of the first user plane network element in the second aspect or the possible design examples of the second aspect, or the third aspect or the possible design examples of the third aspect. For details, refer to the detailed descriptions in the method example. Details are not described herein again.

In a possible design, a structure of the communication apparatus includes a transceiver and a processor, and optionally further includes a memory. The transceiver is configured to send and receive information or data, and is configured to communicate and interact with another device in a communication system. The processor is configured to support the communication apparatus in performing a corresponding function of the first user plane network element in the second aspect or the possible design examples of the second aspect, or the third aspect or the possible design examples of the third aspect. The memory is coupled to the processor, and stores program instructions and data that are necessary for the communication apparatus.

According to a sixth aspect, an embodiment of this application provides a communication system. The communication system may include the foregoing SMF, the foregoing first user plane network element, and the like.

According to a seventh aspect, an embodiment of this application provides a computer-readable storage medium. The computer-readable storage medium stores program instructions. When the program instructions are run on a computer, the computer is enabled to perform the method in any possible design of the first aspect, the second aspect, or the third aspect. For example, the computer-readable storage medium may be any usable medium that can be accessed by a computer. The following provides an example but does not impose a limitation: The computer-readable medium may include a non-transitory computer-readable medium, a random access memory (RAM), a read-only memory (ROM), an electrically erasable programmable read-only memory (electrically EPROM, EEPROM), a CD-ROM or another compact disc storage, a magnetic disk storage medium or another magnetic storage device, or any other medium that can be used to carry or store expected program code in a form of instructions or a data structure and can be accessed by the computer.

According to an eighth aspect, an embodiment of this application provides a computer program product including computer program code or instructions. When the computer program product runs on a computer, the computer is enabled to implement the method in any possible design of the first aspect, the second aspect, or the third aspect.

According to a ninth aspect, this application further provides a chip. The chip includes a processor and a communication interface. The processor is coupled to a memory, and is configured to read and execute program instructions stored in the memory, to enable the chip to implement the method in any possible design of the first aspect, the second aspect, or the third aspect.

For the fourth aspect to the ninth aspect and technical effects that can be achieved in the fourth aspect to the ninth aspect, refer to descriptions of technical effects that can be achieved in possible solutions in the first aspect, the second aspect, or the third aspect. Details are not described herein again.

DETAILED DESCRIPTION OF ILLUSTRATIVE EMBODIMENTS

The following further describes in detail this application with reference to the accompanying drawings.

Embodiments of this application provide a communication method and apparatus, to trigger insertion of a local session anchor. In this way, an application server near an access point of a terminal device is selected, so that a path between the terminal device and the application server is short. The method and the apparatus of this application are based on a same technical concept. The method and the apparatus have similar principles for resolving problems. Therefore, for implementation of the apparatus and the method, refer to each other. Repeated parts are not described in detail again.

In descriptions of this application, terms such as "first" and "second" are used only for distinction and description, but cannot be understood as indicating or implying relative importance, or as indicating or implying a sequence.

It should be understood that, in embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

To describe technical solutions in embodiments of this application more clearly, the following describes the communication method and apparatus according to embodiments of this application in detail with reference to the accompanying drawings.

Figure 1:
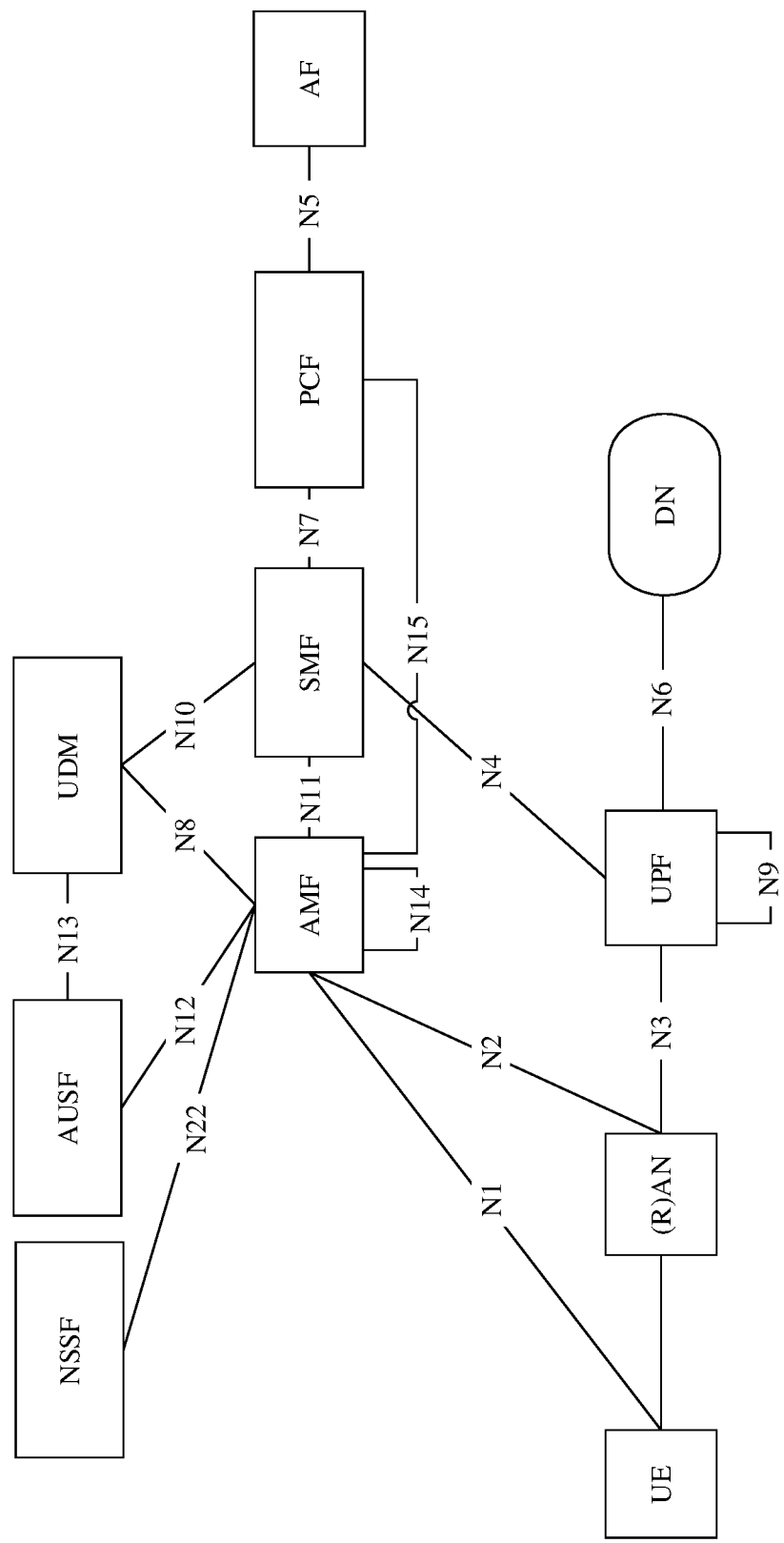
FIG. 1 is a schematic diagram of a 5G network architecture according to this application.

FIG. 1 shows a 5G network architecture. The network architecture includes network slice selection function (NSSF), an authentication server function (AUSF), a unified data management network element (UDM), a network element that implements an access and mobility management function (AMF), a network element that implements a session management function (SMF), a network element that implements a policy control function (PCF), a network element that implements an application function (AF), a terminal device, a radio access network (RAN) node (or device), a user plane network element (UPF), and a data network (DN). The network elements or devices may be connected through interfaces. An interface name shown in FIG. 1 is merely an example for description. This is not specifically limited in this embodiment of this application. The following describes in detail a function of a part of the network elements or devices in the network architecture.

The terminal device may also be referred to as user equipment (UE), a mobile station (MS), a mobile terminal (MT), or the like, and is a device that provides voice and/or data connectivity to a user. For example, the terminal device may include a handheld device or a vehicle-mounted device that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like. In FIG. 1, the terminal device is shown by using UE as an example, and is not limited thereto.

A radio access network may be an access network (AN) shown in FIG. 1 and provide a wireless access service for the terminal device. The RAN node (or device) is a device that connects the terminal device to a wireless network in the network architecture. Currently, some examples of the RAN node are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a wireless fidelity (Wi-Fi) access point (AP).

The DN may be the Internet, an IP multi-media service (IMS) network, an area network (namely, a local network, for example, a mobile edge computing (MEC) network), or the like. The DN is an access destination of a PDU session of the terminal device. The data network includes an application server, and the application server provides a service for the terminal device by transmitting data to the terminal device.

A core network is configured to connect the terminal device to a DN that can implement the service of the terminal device. The following describes functions of network elements in the core network.

The AMF may access non-access stratum (NAS) signaling (including session management (SM) signaling) of the UE through an N1 interface and access signaling of a RAN through an N2 interface, to complete a registration procedure, SM signaling forwarding, and mobility management of the terminal device.

The SMF may complete a procedure related to session establishment, release, update, or the like.

The PCF may be responsible for policy management of the terminal device, including both a mobility-related policy and a PDU session-related policy, for example, a quality of service (QoS) policy and a charging policy.

The UPF may be responsible for forwarding user data.

The UDM stores subscription data of the terminal device, registration information related to the terminal device, and the like.

The AUSF may be responsible for performing authentication and authorization on access of the UE.

A main function of the AF is to interact with a 3rd generation partnership project (3GPP) core network to provide a service, to affect service flow routing, access network capability exposure, policy control, and the like.

Each of the foregoing network elements in the core network may also be referred to as a functional entity, and may be a network element implemented on dedicated hardware, or may be a software instance running on dedicated hardware, or an instance of a virtual function on a proper platform. For example, the virtualization platform may be a cloud platform.

It should be noted that the network architecture shown in FIG. 1 is not limited to including only the network elements shown in the figure, and may further include another device not shown in the figure. Details are not described herein in this application one by one.

It should be noted that a distribution form of the network elements in the core network is not limited in this embodiment of this application. The distribution form shown in FIG. 1 is merely an example, and is not a limitation on this application.

For ease of description, the network elements shown in FIG. 1 are used as examples for description subsequently in this application, and an XX network element is directly referred to as XX for short. For example, a UPF network element is referred to as a UPF for short. It should be understood that names of all network elements in this application are merely used as examples, and may also be referred to as other names in future communication, for example, 6G, or the network element in this application may be replaced by another entity or device that has a same function in future communication, for example, 6G. This is not limited in this application. A unified description is provided herein. Details are not described later.

It should be noted that the 5G network architecture shown in FIG. 1 does not constitute a limitation on a 5G network. Optionally, the method in embodiments of this application is further applicable to various future communication systems, for example, 6G or other communication networks.

Figure 2:
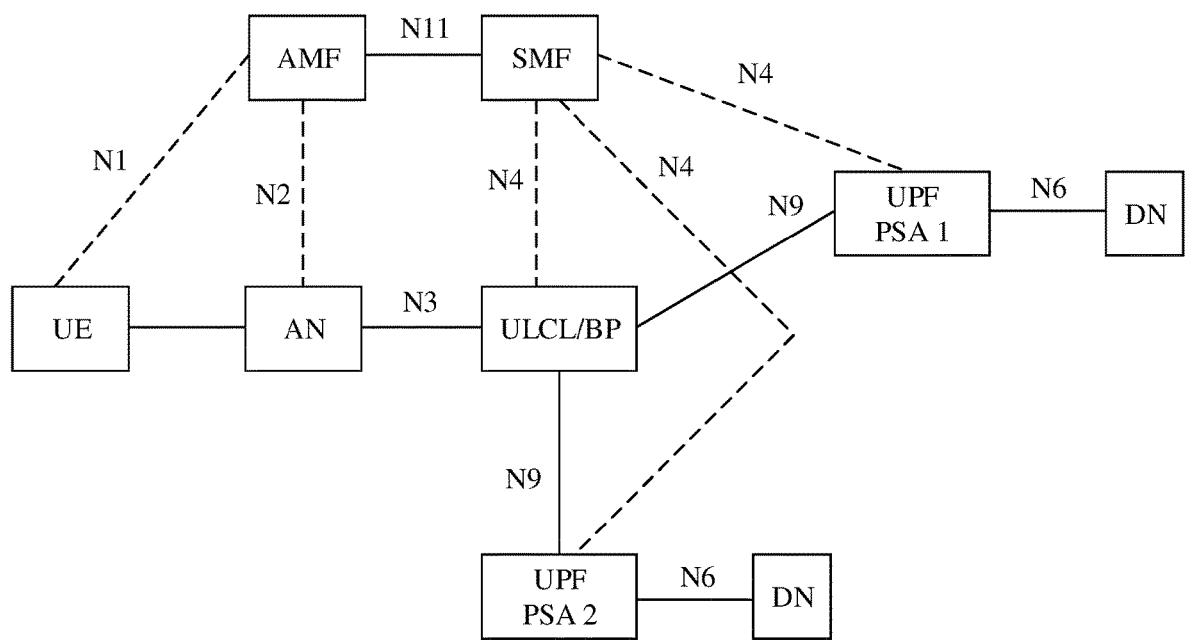
FIG. 2 is a schematic diagram of an architecture of a communication system according to this application.

There is only one UPF in the 5G network architecture shown in FIG. 1. Based on the foregoing basic architecture, 5G further supports insertion of a plurality of session anchor UPFs on a user plane path of a PDU session, to support a connection to a local DN, so that UE can access a nearest application server in the local DN, for example, as shown in an architecture of a communication system in FIG. 2. The plurality of UPFs introduced to the architecture of the communication system in FIG. 2 include a ULCL/BP, a UPF PSA 1, and a UPF PSA 2. The ULCL/BP distributes, to the PSA 1 or the PSA 2 according to a distribution rule, an uplink data packet received from the UE, and sends, to the UE, a data packet received from the PSA 1 or the PSA 2. There is an N6 interface between the PSA 1 and a DN. For example, the DN may be a DN located in a central DC. There is an N6 interface between the PSA 2 and a local DN. For example, the local DN may be located in a local DC (namely, an MEC). When a UPF connected to the local DN exists at a location of the UE, an SMF may use the UPF as a local (local, L) PSA, and insert the UPF into a session path, so that the UE can access a nearest application in the local DN. For example, the PSA 2 in FIG. 2 is an L-PSA. It should be noted that a quantity of UPFs in FIG. 2 is merely an example, and more or fewer UPFs may alternatively be included. This is not limited in this application.

Figure 3:
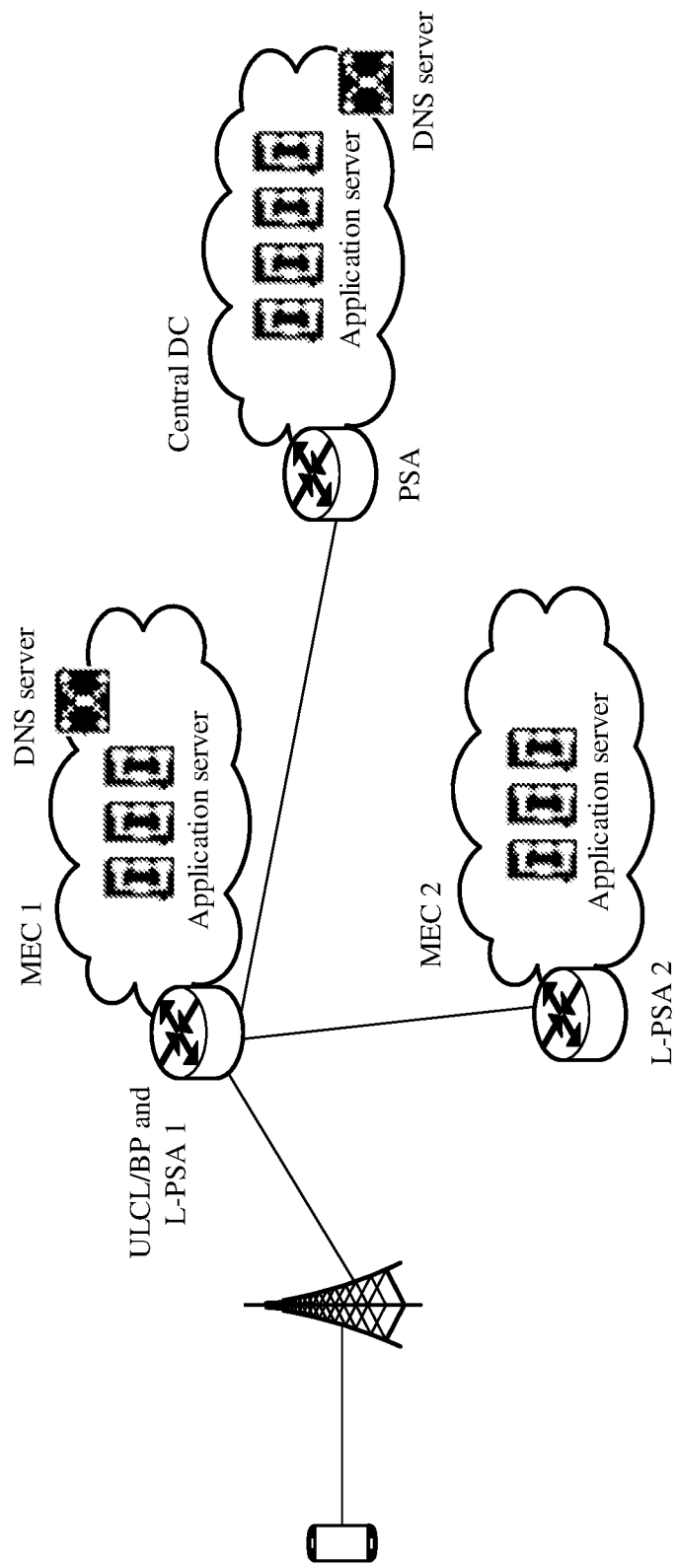
FIG. 3 is a schematic diagram of a network architecture according to this application.

It should be noted that only one L-PSA is shown in FIG. 2. It should be understood that a plurality of L-PSAs may alternatively be included. This is not limited in this application. For example, in a network architecture shown in FIG. 3, there are a plurality of L-PSAs, for example, an L-PSA 1 and an L-PSA 2 in FIG. 3. In the network architecture, a ULCL/BP may be connected to the plurality of L-PSAs. In this example, the ULCL/BP and the L-PSA 1 are integrated and connected to an MEC 1, the L-PSA 2 is connected to an MEC 2, and a PSA is connected to a central DC. It should be understood that the ULCL/BP and the L-PSA 1 may be two independent devices. A same application server may be deployed in a central DC and a local DC. There is no good implementation method for how to select an application server for a terminal device, so that a path between the terminal device and the application server is the shortest. Based on this, this application provides a communication method, to trigger insertion of a local session anchor. In this way, an application server near an access point of the terminal device is selected, so that a path between the terminal device and the application server is short.

Figure 4:
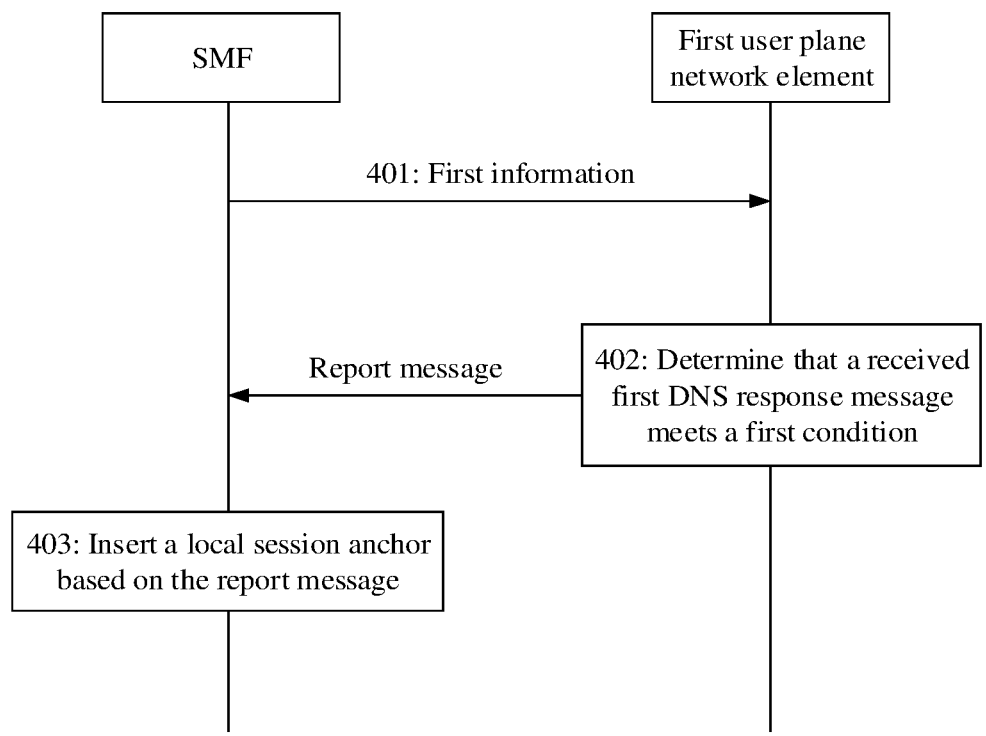
FIG. 4 is a flowchart of a communication method according to this application.

An embodiment of this application provides a communication method. The communication method is applicable to the communication system shown in FIG. 2. Refer to FIG. 4. A specific procedure of the method may include the following steps.

Step 401: An SMF sends first information to a first user plane network element. The first information indicates the first network element to send a report message to the SMF when receiving a first domain name server (DNS) response message that meets a first condition. The report message includes information about an application server indicated by the first DNS response message or information about a data network corresponding to the application server. In addition, optionally, the report message may further include the first DNS response message. Alternatively, in another implementation, the report message is the first DNS response message. This may be understood as that the first information indicates the first user plane network element to forward the first DNS response message to the SMF when receiving the first DNS response message that meets the first condition. The first user plane network element may be considered as a remote anchor UPF, or certainly may be another UPF network element. This is not limited in this application.

In a specific implementation, the information about the application server in the report message may be an IP address of the application server; and the information about the data network corresponding to the application server may be information about the data network (for example, an MEC) in which the application server is located, for example, a DNAI or network segment information of the data network.

Step 402: The first user plane network element sends the report message to the SMF when determining that the received first DNS response message meets the first condition. The first DNS response message is from a DNS server.

Step 403: The SMF inserts a local session anchor based on the report message.

In an optional implementation, when the first information includes an address range of a data network where the report message needs to be sent, the first condition is that an (IP) address of the application server indicated by the first DNS response message belongs to the address range. Alternatively, when the first information further indicates information about an anycast address where the report message needs to be sent, the first condition is that an address of the application server indicated by the first DNS response message is included in the information about the anycast address. Herein, the address range of the data network may be one or more of the following: an IP address list, an IP address segment, an IP address prefix plus a prefix length, or a subnet IP address plus a subnet mask.

In an optional implementation, the first information may alternatively include a DNAI corresponding to a data network where the report message needs to be sent. In this case, the first condition may be that the application server indicated by the first DNS response message is located in the data network corresponding to the DNAI. Specifically, the first user plane network element may obtain an address range of the data network corresponding to the DNAI, and then determine whether an IP address of the application server belongs to the address range.

In an example, the first condition is that the IP address of the application server is within the address range of the data network. In this case, in step 402, the first user plane network element sends the report message to the SMF when determining that the IP address of the application server indicated by the first DNS response message belongs to the data network.

In another example, the first condition is that the address of the application server indicated by the first DNS response message is the anycast address. In this case, in step 402, the first user plane network element sends the report message to the SMF when determining that the address of the application server indicated by the first DNS response message is the anycast address. It should be noted that the first information may indicate to send the report message when the address of the application server is any anycast address. In this case, the first information may not carry information about the anycast address that needs to be reported, or carry information indicating any anycast address. When the first information specifies a specific anycast address where the report message needs to be sent, the first information may include a range of anycast addresses where the report message needs to be sent. Similar to the address range of the data network, the range of anycast addresses may be one or more of the following: an anycast address list, an anycast address segment, an anycast address prefix plus a prefix length, or an anycast address prefix plus a subnet mask.

In an optional implementation, before sending the first information to the first user plane network element, the SMF sends second information to the first user plane network element. The second information indicates access information of a terminal device. The access information of the terminal device indicates a location of an access point of the terminal device. For example, the access information of the terminal device is a data network access identifier (DNAI) corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message. For example, the address range may be one or more of the following: subnet information (for example, a subnet address), an address list, an address segment (the first and last addresses), an address prefix/prefix length, or an address plus a subnet mask. The data network may be an MEC.

The SMF may send the access information of the terminal device to the first user plane network element by using the second information when a PDU session is established. For example, the second information is included in an N4 (namely, packet forwarding control protocol (PFCP)) session establishment message. Alternatively, the SMF may send new access information of the terminal device to the first user plane network element by using the second information when the access information of the terminal device changes and needs to be updated. For example, the second information is included in an N4 session modification message.

Specifically, before sending the second information to the first user plane network element, the SMF obtains location information of the terminal device from an AMF, and determines the access information of the terminal device based on the location information of the terminal device. For example, the location information of the terminal device may be a tracking area identity (tracking area identity, TAI). The SMF may determine, based on the TAI, the DNAI corresponding to the data network (for example, an MEC) that can be accessed by the terminal device. For example, the SMF may subscribe to, from the AMF, an event that the terminal device moves out of or moves into a service area of the DNAI. When the terminal device moves out of or moves into the service area of the DNAI, the AMF sends a notification message to the SMF, and the SMF may determine, based on the notification message, the DNAI corresponding to the data network that can be accessed by the terminal device. It should be noted that a local data network in this application may also be referred to as an MEC.

In an example, the SMF may configure a correspondence between location information of the terminal device and a DNAI. The correspondence may be a DNAI corresponding to a location area (for example, a TA list), or a location area (for example, a TA list) included in a service area of a DNAI. To obtain the address range of the data network, the SMF may configure a correspondence between a DNAI and an address range; or an AF provides the address range of the data network for a core network (and finally sends the address range to the SMF). The AF may be an MEC platform. The AF may send the correspondence between a DNAI and an address range. Alternatively, the AF sends only the address range, and the core network determines, based on the AF, a DNAI corresponding to the address range.

In another optional embodiment, the SMF may determine, according to a policy and charging control (policy and charging control, PCC) rule, the access information of the UE that is to be sent to the first UPF. The SMF sends only a DNAI included in the PCC rule or subnet information corresponding to the DNAI.

In an optional implementation, the second information further indicates priorities of the access information of the terminal device, so that the first user plane network element selects the application server for the terminal device based on the priorities of the access information of the terminal device. Optionally, the SMF may indicate preferred access information of the terminal device. In other words, the first user plane network element preferably selects the application server based on the access information. For example, when the terminal device can access a plurality of data networks at a current location, the SMF may indicate priorities of the plurality of data networks, and the first user plane network element selects, based on the priorities of the data networks, an application server from a data network in which the application server exists and has a highest priority. Herein, each data network corresponds to one piece of access information of the terminal device.

In a specific implementation, the second information further indicates the first user plane network element to process, based on the access information of the terminal device, a DNS request message sent by the terminal device. Optionally, the processing may include: sending, based on the access information of the terminal device, the DNS request message to a DNS server that matches the access information of the terminal device; or adding the access information of the terminal device to the DNS request message.

Correspondingly, after receiving the DNS request message from the terminal device, the first user plane network element adds the access information of the terminal device to the DNS request message, to obtain a new DNS request message, and forwards the new DNS request message; or the first user plane network element determines the DNS server corresponding to the access information of the terminal device, and sends the DNS request message to the DNS server corresponding to the access information of the terminal device. The DNS server corresponding to the access information of the terminal device may be configured in the first user plane network element, or may be obtained by the first user plane network element in another manner, for example, sent by the SMF to the first user plane network element.

In an optional implementation, when the access information of the terminal device is a plurality of pieces of access information, that the first user plane network element adds the access information of the terminal device to the DNS request message, to obtain a new DNS request message may specifically include the following two methods.

Method a1: The first user plane network element adds each piece of access information to the DNS request message. In this way, a new DNS request message is obtained based on each piece of access information. When there are a plurality of pieces of access information, the first user plane network element obtains a plurality of new DNS request messages.

In this case, after the first user plane network element forwards the plurality of new DNS request messages, the DNS server that receives the plurality of new DNS request messages may return one DNS response message for each DNS request message. In other words, in this case, there are a plurality of first DNS response messages. Correspondingly, the first user plane network element may obtain information about a plurality of application servers.

Method a2: The first user plane network element adds the plurality of pieces of access information to the DNS request message, to generate a new DNS request message including the plurality of pieces of access information. In this case, after the first user plane network element forwards the DNS request message including the plurality of pieces of access information, the DNS server that receives the DNS request message including the plurality of pieces of access information may determine one application server for each piece of access information, and return one first DNS response message including information about a plurality of application servers. In this case, the first user plane network element may obtain the information about the plurality of application servers.

In an optional implementation, the access information of the terminal device is a plurality of pieces of access information. In this case, that the first user plane network element determines the DNS server corresponding to the access information of the terminal device, and sends the DNS request message to the DNS server corresponding to the access information of the terminal device may be specifically: The first user plane network element determines a DNS server corresponding to each of the plurality of pieces of access information, and sends the DNS request message to a DNS server corresponding to each piece of access information. In this case, a DNS server corresponding to each of the plurality of pieces of access information returns one DNS response message. That is, in this case, there are a plurality of first DNS response messages. Correspondingly, the first user plane network element may obtain information about a plurality of application servers.

In one case, if the access information of the terminal device corresponds to no DNS server, the first user plane network element may forward the DNS request message to a DNS server requested by the DNS request message (namely, a DNS server indicated by a destination address of the DNS request message).

In another case, if the DNS server corresponding to the access information of the terminal device returns a response message indicating that no corresponding application server is found, the DNS request message may be forwarded to a DNS server requested by the DNS request message.

Optionally, in the foregoing method, when the access information of the terminal device is the plurality of pieces of access information, the first user plane network element may obtain the plurality of first DNS response messages, so that when the first user plane network element obtains the information about the plurality of application servers, a possible case may be: The plurality of first DNS response messages corresponding to the plurality of pieces of access information received by the first user plane network element include the information about the plurality of application servers. In this case, each first DNS response message may include information about one application server; or a part of the plurality of first DNS response messages may include the information about the application servers, and the remaining part of the first DNS response messages do not include the information about the application servers. Each of the part of the first DNS response messages may include information about at least one application server.

Optionally, when obtaining the information about the plurality of application servers, the first user plane network element determines a target application server based on priorities of access information of access networks corresponding to the plurality of application servers. In this case, the report message further includes information about the target application server or access network information corresponding to the target application server; or the report message is a first DNS response message including information about the target application server.

Alternatively, optionally, when the first user plane network element obtains the information about the plurality of application servers, the report message includes the information about the plurality of application servers or access network information corresponding to each of the plurality of application servers; or the report message is (one or more) first DNS response messages including the information about the plurality of application servers. In this case, the SMF network element determines the target application server.

It should be noted that, if the first user plane network element forwards the plurality of new DNS request messages, or the first user plane network element sends the DNS request message to each of the DNS servers corresponding to the plurality of pieces of access information, that is, sends a plurality of request messages, the first user plane network element needs to send the report message to the SMF after DNS response messages of all sent DNS request messages are received or response timeout occurs.

In an example, the first information further indicates the first user plane network element to buffer the first DNS response message. Correspondingly, the first user plane network element buffers the first DNS response message when sending the report message to the SMF. The first DNS response message buffered by the first user plane network element is (one or more) first DNS response messages corresponding to the application servers included in the report message.

It should be noted that if the first user plane network element receives the plurality of first DNS response messages, and determines the target application server based on the plurality of first DNS response messages, the first user plane network element may buffer only the first DNS response message including the information about the target application server. Certainly, the first user plane network element may alternatively buffer all first DNS response messages. This is not limited in this application.

In an optional implementation, the SMF sends third information to the first user plane network element after inserting the local session anchor, where the third information indicates the first user plane network element to send a second DNS response message to the terminal device. Then, the first user plane network element sends the second DNS response message to the terminal device. The second DNS response message indicates the target application server selected for the terminal device, and the second DNS response message is the first DNS response message, or the second DNS response message is determined based on the first DNS response message. When the second DNS response message is the first DNS response message, the first DNS response message is a DNS response message buffered by the first user plane network element.

When the second DNS response message is the first DNS response message buffered by the first user plane network element, the first user plane network element receives only one first DNS response message, and the first DNS response message includes only an address of the target application server; or the first user plane network element buffers only one first DNS response message, and the first DNS response message includes only an address of the target application server.

In the foregoing method a2, the first DNS response message may include the information about the plurality of application servers (for example, addresses of the application servers). When receiving the third information, the first user plane network element deletes an address of an application server other than the target application server from the first DNS response message, to generate the second DNS response message.

In an optional implementation, when the report message may include the information about the plurality of application servers, the second information may not include the priorities, and the first user plane network element sends, to the SMF, the report message including the received information about the plurality of application servers. When the report message includes the information about the plurality of application servers, the SMF determines a target application server, where the third information includes an address of the target application server. In this case, the first user plane network element determines a second DNS response message based on the address of the target application server in the third information. Specifically, when the second DNS response message is determined based on the first DNS response message, to be specific, the first user plane network element determines the second DNS response message based on the address of the target application server in the third information, the following several cases may be specifically included.

Case b1: When the first DNS response message includes addresses of the plurality of application servers, the first user plane network element deletes, based on the address of the target application server included in the third information, information about an application server other than the address of the target application server in the first DNS response message, to generate the second DNS response message. That is, only the address of the target application server in the first DNS response message is reserved, to obtain the second DNS response message. The second DNS response message includes the address of the target application server.

Case b2: When there are a plurality of first DNS response messages, the first user plane network element selects, from the plurality of first DNS response messages based on the address of the target application server included in the third information, one first DNS response message including the address of the target application server, and uses the first DNS response message as the second DNS response message. The second DNS response message includes the address of the target application server.

In another example, the report message is the first DNS response message, or the report message includes the first DNS response message. In this way, the first user plane network element does not need to buffer the first DNS response message, and may forward the first DNS response message to the SMF as the report message. In an optional implementation, the SMF sends a third DNS response message to the terminal device after inserting the local session anchor, where the third DNS response message indicates a target application server selected for the terminal device, and the third DNS response message is the first DNS response message, or the third DNS response message is determined based on the first DNS response message. Optionally, that the SMF sends a third DNS response message to the terminal device may include: The SMF sends the third DNS response message to the first user plane network element, and the first user plane network element sends the third DNS response message to the terminal device.

When the third DNS response message is the first DNS response message, the first user plane network element receives only one first DNS response message, where the first DNS response message includes only an address of the target application server, and the report message includes only the first DNS response message.

When the third DNS response message is determined based on the first DNS response message, the following cases may be included.

Case c1: When the first DNS response message includes addresses of a plurality of application servers, that is, the report message includes the addresses of the plurality of application servers, the SMF determines the address of the target application server, and deletes information about an application server other than the address of the target application server in the first DNS response message, to generate the third DNS response message. That is, only the address of the target application server in the first DNS response message is reserved, to obtain the third DNS response message. The third DNS response message includes the address of the target application server.

Case c2: When the first DNS response message includes addresses of a plurality of application servers, and the report message includes the address of the target application server (that is, the first user plane network element determines the address of the target application server), the SMF deletes, based on the address of the target application server, information about an application server other than the address of the target application server in the first DNS response message, to generate the third DNS response message. That is, only the address of the target application server in the first DNS response message is reserved, to obtain the third DNS response message. The third DNS response message includes the address of the target application server.

Case c3: When the report message is a plurality of first DNS response messages, or the report message includes a plurality of first DNS response messages, the SMF determines the address of the target application server, selects, from the plurality of first DNS response messages, one first DNS response message including the address of the target application server, and uses the first DNS response message as the third DNS response message. The third DNS response message includes the address of the target application server.

In an optional implementation, when the SMF performs step 403, a specific method may be: The SMF determines, based on the information about the application server, a DNAI of the data network in which the application server is located, to determine the to-be-inserted local session anchor. Alternatively, the SMF determines the to-be-inserted local session anchor based on a DNAI corresponding to the information about the data network. For example, when determining, based on the information about the application server, that there is no local session anchor connected to the data network corresponding to the application server (that is, no local session anchor connected to the data network is inserted), the SMF determines that the local session anchor connected to the data network needs to be inserted, and selects the local session anchor based on the DNAI of the data network. It should be noted that the DNAI corresponding to the information about the data network may be understood as that the information about the data network is the DNAI, or the information about the data network indicates the DNAI. For example, the information about the data network is the address range of the data network, and the SMF determines the DNAI of the data network based on the address range of the data network.

In another optional implementation, the SMF obtains routing information of the anycast address. The routing information of the anycast address includes information about at least one network element that implements a user plane function and that corresponds to the anycast address, or a DNAI of a data network corresponding to the anycast address. The SMF determines the local session anchor based on access information of the terminal device and the routing information of the anycast address. Optionally, the SMF may further determine, based on the DNAI of the data network, the session anchor that needs to be inserted.

For example, when determining, based on the access information of the terminal device and the routing information of the anycast address, that the data network that can be currently accessed by the terminal device supports the anycast address and no local session anchor connected to the data network is inserted, the SMF determines that the local session anchor needs to be inserted. The SMF may determine the local session anchor based on the DNAI corresponding to the data network.

For example, the SMF may configure the routing information of the anycast address.

In an optional implementation, when determining that no ULCL UPF is inserted into a PDU session of the terminal device, the SMF determines that the ULCL UPF needs to be inserted, and inserts the ULCL UPF.

According to the communication method provided in this embodiment of this application, in a process of discovering the application server, insertion of the local session anchor can be triggered by using the first condition. Therefore, the application server near the access point of the terminal device is selected, so that a path between the terminal device and the application server is short.

Figure 5:
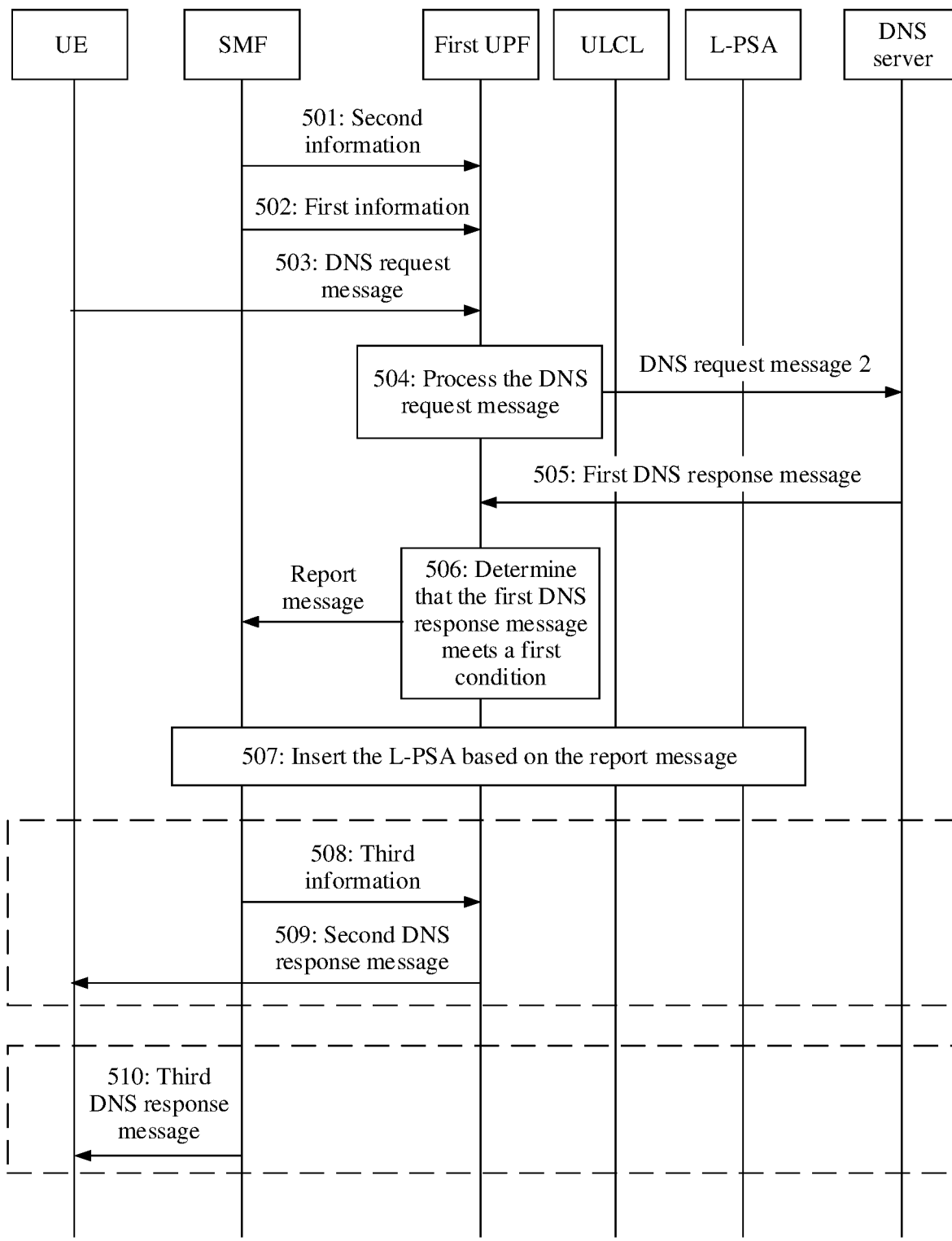
FIG. 5 is a flowchart of an example of a communication method according to this application.
Figure 6:
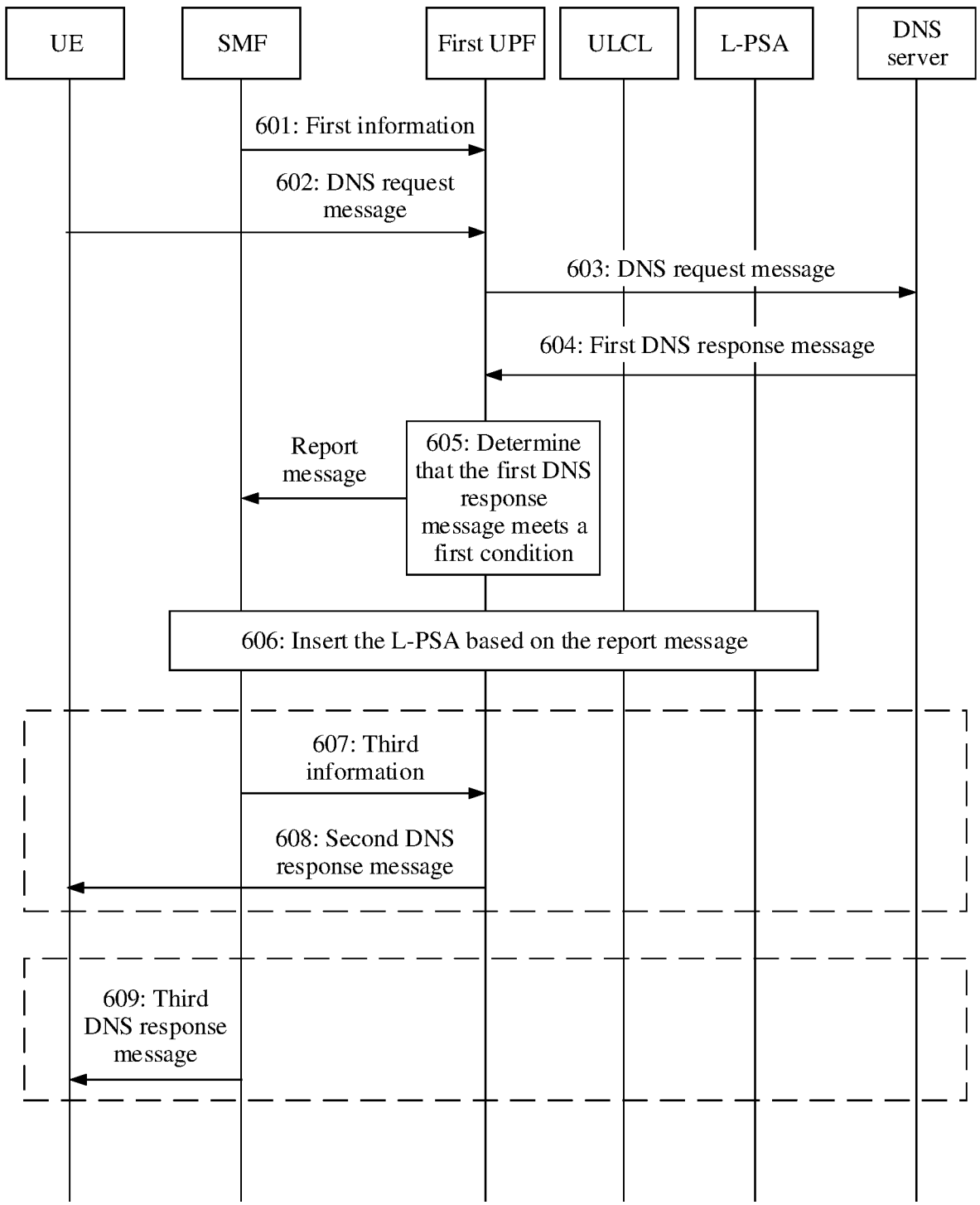
FIG. 6 is a flowchart of an example of another communication method according to this application.

Based on the foregoing embodiments, the following describes the communication method provided in embodiments of this application in detail by using specific examples, for example, embodiments shown in FIG. 5 and FIG. 6. In the following example, an example in which the terminal device is UE, the first user plane network element is a first UPF, the local session anchor is an L-PSA, and the data network is an MEC is used for description.

FIG. 5 shows an example of a communication method. In this example, a scenario is as follows: UE has created a PDU session, and an SMF has not inserted a ULCL into the PDU session; or an SMF has inserted a ULCL, but has not inserted an L-PSA corresponding to a nearest application server that provides an application and that can be accessed by UE. Specifically, a specific procedure of this example may include the following steps.

Step 501: The SMF sends second information to a first UPF, where the second information indicates access information of the UE.

Specifically, the access information of the UE may be a DNAI corresponding to an MEC that can be currently accessed by the UE, or an address range (or an address in the address range) of an MEC that can be currently accessed by the UE, for example, one or more of the following: subnet information (for example, a subnet address), an address list, an address segment (the first and last addresses), an address prefix/prefix length, or an address plus a subnet mask of the MEC. Alternatively, the access information may be address information of a UPF corresponding to a data network that can be accessed by the UE (for example, an interface address of the UPF, or an address that is configured in the UPF and that is used to provide communication for the UE, for example, an address used to perform NAT translation). Alternatively, the access information may be address information of a DNS server corresponding to a data network that can be accessed by the UE.

Optionally, the SMF may send the access information of the UE to the first UPF by using the second information when the PDU session is established. For example, the second information may be included in an N4 session establishment request message. Alternatively, the SMF may send new access information to the first UPF by using the second information when the access information of the UE changes and needs to be updated. For example, the second information may be included in an N4 session modification request message.

In an optional implementation, the SMF obtains location information (for example, a TAI) of the UE from an AMF, and determines the access information of the UE based on the location information of the UE, for example, the DNAI corresponding to the MEC that can be accessed by the UE. For example, the SMF may configure a correspondence between location information and a DNAI. The correspondence may be a DNAI corresponding to a location area (for example, a TA list), or a location area (for example, a TA list) served by a DNAI. To obtain the address range (for example, network segment information) of the MEC, the SMF may configure a correspondence between a DNAI and an address range; or an AF provides the address range of the MEC for a core network (and finally sends the address range to the SMF). The AF may be an MEC platform. The AF may send the correspondence between a DNAI and an address range. Alternatively, the AF sends only the address range, and the core network determines, based on the AF, a DNAI corresponding to the address range.

In another optional embodiment, the SMF may determine, according to a PCC rule, the access information of the UE that is to be sent to the first UPF. The SMF sends only a DNAI included in the PCC rule or subnet information of an MEC corresponding to the DNAI.

In an optional implementation, the second information further indicates priorities of the access information of the terminal device, so that the first UPF selects an application server for the UE based on the priorities of the access information of the UE. For example, the first UPF preferably selects the application server based on the access information. For example, when the UE can currently access a plurality of MECs, the SMF may indicate priorities of the plurality of MECs, and the first UPF selects, based on the priorities of the MECs, an MEC having a highest priority in MECs that support the application server, and selects an application server from the MEC. Herein, each MEC corresponds to one piece of access information of the UE.

In an optional implementation, the second information further indicates that the first UPF can discover a DNS request message sent by the UE, and process the DNS request message based on the access information of the UE. For example, the processing may be the following two types.

One processing is sending, based on the access information of the UE, the DNS request message to a DNS server that matches the access information of the UE. For example, the access information of the UE is the DNAI. The first UPF may obtain a mapping relationship between a DNAI and a DNS server address. When receiving the DNS request message, the first UPF determines the DNS server based on the access information of the UE, and sends the DNS request message to the determined DNS server.

Another processing is inserting the access information of the UE into the DNS request message. For example, the access information of the UE may be the subnet information of the MEC that can be accessed by the UE.

Step 502: The SMF sends first information to the first UPF. The first information indicates the first UPF to send a report message to the SMF when receiving a first DNS response message that meets a first condition.

Optionally, the first information may also be included in the N4 session establishment request message or the N4 session modification request message. It should be noted that the N4 session establishment/modification request message including the first information may include the second information, or may not include the second information.

In this example, the first condition is that an IP address of an application server indicated by the first DNS response message belongs to the address range of the data network included in the first information. In this case, the first information includes an address range of an MEC where the report message needs to be sent.

In this way, the SMF can indicate the first UPF to send the report message to the SMF only when the application server indicated by the first DNS response message is located in the MEC that has not been inserted. This reduces a quantity of report messages sent by the first UPF. Specifically, the SMF may send, to the first UPF, the first information including the information about the MEC where the first UPF needs to send the report message. For example, the information may be the DNAI corresponding to the MEC or the address range corresponding to the MEC. Herein, the information about the MEC where the report message needs to be sent is a subset of the access information of the UE (in the second information).

In an optional implementation, the first information further indicates the first UPF to temporarily buffer the first DNS response message.

Step 503: The UPF receives the DNS request message sent by the UE.

Step 504: The first UPF processes the DNS request message, and sends a DNS request message 2.

The first UPF may process the DNS request message according to an indication of the second information.

Specifically, the first UPF checks a data packet sent by the UE, and performs the following processing on the DNS request message based on the access information of the UE if the data packet is the DNS request message.

In a first implementation, the first UPF inserts the access information of the UE into the DNS request message. For example, the access information of the UE may be a subnet address or the DNAI corresponding to the MEC that can be currently accessed by the UE. Then, the first UPF uses, as a new DNS request message (denoted as the DNS request message 2 herein), the DNS request message into which the access information of the UE is inserted, and sends the new DNS request message to the DNS server, where the DNS server is a DNS server specified by the DNS request message of the UE. If there are a plurality of pieces of access information of the UE, the first UPF may generate, by inserting access information, one DNS request message for each piece of access information (which may be understood as generating a plurality of DNS request messages 2) based on the plurality of pieces of access information of the UE, and the UPF sends the plurality of new DNS request messages to the DNS server. Alternatively, the first UPF may insert the plurality of pieces of access information into the DNS request message, and send the DNS request message to the DNS server.

In a second implementation, the UPF determines, based on the access information of the UE, the DNS server corresponding to the access information, and sends the DNS request message to the DNS server corresponding to the access information. In this method, the first UPF sends the DNS request message to a DNS server that is not requested by the UE; or an address of a DNS server requested by the UE is an anycast address, and the first UPF determines, based on the access information of the UE, that the DNS server corresponding to the anycast address is the DNS server corresponding to the access information. Certainly, when the determined DNS server corresponding to the access information is not the DNS server requested by the UE, the first UPF may also send the DNS request message to the DNS server requested by the UE. Alternatively, when the address of the DNS server requested by the UE is the anycast address, the first UPF may send the DNS request message to DNS servers corresponding to all the access information, and may further send the DNS request message to a DNS server that corresponds to the anycast address and that is located in a central data center DC. Optionally, when there are a plurality of pieces of access information of the UE, and each of the plurality of pieces of access information corresponds to a DNS server, the first UPF may send the DNS request message to each of the plurality of DNS servers. In this method, the UPF does not need to modify the DNS request message. The DNS server corresponding to the access information of the UE may be configured in the first UPF, or may be obtained by the first UPF by using another method, for example, sent by the SMF to the first UPF.

In an optional implementation, the first UPF may preferably obtain an IP address of the DNS server in the MEC that can be accessed by the UE. If the application server requested by the UE does not exist in the MEC, the UPF attempts to select another application server. For example, in the second implementation, if the first UPF does not obtain the IP address of the application server from the DNS server corresponding to the access information of the UE, the first UPF then sends the DNS request message to the DNS server requested by the UE (or the DNS server in the central DC). Optionally, the first UPF may determine, based on the priorities of the access information in the second information, an order of sending the DNS request message. For example, the first UPF first sends the DNS request message to a DNS server corresponding to access information having a highest priority.

Step 505: The first UPF receives the first DNS response message.

Specifically, the first UPF receives the first DNS response message from the DNS server. If the first UPF sends a plurality of DNS request messages, the returned first DNS response message may indicate that no corresponding application server is found.

If the first UPF inserts the access information of the UE into the DNS request message, optionally, the DNS server may indicate, in the first DNS response message, access information corresponding to the selected application server, that is, the DNS server is an application server selected based on the access information.

In an example, the UE has the plurality of pieces of access information. In this case, in the first implementation in step 504, when the first UPF sends the plurality of new DNS request messages to the DNS server, the DNS server that receives the plurality of new DNS request messages may return one DNS response message for each DNS request message. In other words, in this case, there are a plurality of first DNS response messages. Correspondingly, the first UPF may obtain information about a plurality of application servers.

In another example, the UE has the plurality of pieces of access information. In this case, in the second implementation of step 504, when the first UPF sends the DNS request message to each of the plurality of DNS servers, the DNS servers corresponding to the plurality of pieces of access information each return one DNS response message. In other words, in this case, there are a plurality of first DNS response messages. Correspondingly, the first UPF may obtain information about a plurality of application servers.

If the first UPF inserts the plurality of pieces of access information into one DNS request message, the first UPF receives one first DNS response message, and the first DNS response message may include information about one or more application servers. Optionally, the first DNS response message further indicates access information corresponding to the one or more application servers.

Step 506: The first UPF sends the report message to the SMF when determining that the first DNS response message meets the first condition. The report message includes information about an application server indicated by the first DNS response message or information about a data network corresponding to the application server.

In a specific implementation, the information about the application server in the report message may be an IP address of the application server; and the information about the data network corresponding to the application server may be information about an MEC in which the application server is located, for example, a DNAI or network segment information of the MEC.

In an implementation, if the IP address of the selected application server in the first DNS response message is an IP address in one MEC corresponding to current access information of the UE, the first UPF sends the report message to the SMF.

Specifically, the access information of the UE may be an address range of an MEC to which the UE can connect at a current access location. The first UPF may determine, based on the address range, whether the IP address of the application server in the first DNS response message belongs to the MEC. Alternatively, when the access information of the UE is the DNAI, the first UPF may obtain an address range of an MEC corresponding to the DNAI, and determine, based on the address range corresponding to the DNAI, whether the IP address of the application server corresponds to the DNAI. The first UPF may locally configure a correspondence between a DNAI and an address range corresponding to the DNAI, or the SMF may send the correspondence to the first UPF.

In another implementation, the first UPF determines, based on the access information corresponding to the selected application server in the first DNS response message, whether a report needs to be sent to the SMF. To be specific, if the access information corresponding to the application server corresponds to an MEC specified by the SMF, the first UPF sends the report to the SMF. In this method, the first DNS response message includes the access information (namely, the information about the MEC) corresponding to the selected application server.

Specifically, when the first UPF sends the report message to the SMF, the first UPF may temporarily buffer the first DNS response message.

In an optional implementation, if there are a plurality of MECs that can be accessed (in other words, there are a plurality of pieces of access information of the UE), the first UPF may select the application server based on information about the plurality of MECs. If the first UPF obtains information about application servers in the plurality of MECs, for example, obtains addresses of application servers in an MEC 1 and an MEC 2, optionally, the first UPF determines a target application server based on priorities (for example, obtained priorities of the MECs) of access information of access networks corresponding to the plurality of application servers. In this case, the report message includes information about the target application server or access network information corresponding to the target application server.

Optionally, if the first UPF obtains IP addresses of application servers in a plurality of different MECs, the first UPF may also send information about the plurality of application servers (addresses of the servers or information about MECs corresponding to the servers) to the SMF. In other words, the report message includes a plurality of pieces of information about the application servers, or includes a plurality of pieces of information about the MECs corresponding to the application servers, and the SMF selects the target application server.

In an optional implementation, the report message is the first DNS response message. To be specific, when the first condition is met, the first UPF sends the first DNS response message to the SMF, where the first DNS response message includes an address of the selected application server. In this manner, the information about the application server in the report message is the information about the application server in the first DNS response message, and the first UPF may not additionally send, in the report message, the information about the application server or the information about the data network corresponding to the application server.

Certainly, optionally, the first UPF may alternatively include, in the report message, both the first DNS response message (where the first DNS response message includes the information about the application server) and the additional information about the application server or information about the data network corresponding to the application server. This is not limited in this application.

Step 507: The SMF inserts a local session anchor L-PSA based on the report message.

Specifically, the SMF determines the to-be-inserted L-PSA based on the information about the application server or the information about the MEC in the report message. Specifically, the SMF may determine, based on the information about the application server, a DNAI of the data network in which the application server is located, to determine the to-be-inserted local session anchor. Alternatively, the SMF determines the to-be-inserted local session anchor based on a DNAI corresponding to the information about the data network. For example, when determining, based on the information about the application server, that the MEC corresponding to the application server has no L-PSA connected, the SMF inserts the L-PSA connected to the MEC.

In an optional implementation, if no ULCL UPF is inserted into the PDU session of the UE, the SMF determines that the ULCL UPF needs to be inserted, and inserts the ULCL UPF. Certainly, if the ULCL UPF has been inserted, the SMF does not need to insert the ULCL UPF.

In an optional implementation, the ULCL UPF inserted by the SMF and the L-PSA connected to the MEC may be co-located.

In an optional implementation, when the first information indicates the first UPF to buffer the first DNS response message, the following steps 508 and 509 are performed after step 507.

Step 508: The SMF sends third information to the first UPF, where the third information indicates the first UPF to send a second DNS response message to the UE.

Optionally, if the report message sent by the first UPF to the SMF in step 507 includes the information about the plurality of application servers, the SMF may indicate the first UPF to select an application server, that is, the SMF determines the target application server. For example, the SMF may indicate an IP address of the selected target application server, or may indicate a DNAI corresponding to the application server. In this case, the third information includes the address of the target application server.

Step 509: The first UPF sends the second DNS response message to the UE.

In an example, when the first UPF receives only one first DNS response message, where the first DNS response message includes only the address of the target application server, the second DNS response message is the first DNS response message buffered by the first UPF.

In another example, if the first DNS response message includes addresses of a plurality of application servers, and the report message sent by the first UPF to the SMF includes information about the plurality of application servers, the first UPF deletes, based on the address of the target application server in a first message of the SMF, information about an application server other than the address of the target application server in the first DNS response message, to generate the second DNS response message. That is, only the address of the target application server in the first DNS response message is reserved, to obtain the second DNS response message. The second DNS response message includes the address of the target application server.

In another example, if the first DNS response message includes addresses of a plurality of application servers, the first UPF determines the target application server based on priorities of access information corresponding to the application servers, and the report message includes only the information of the target application server, the first UPF deletes information about an application server other than the address of the target application server in the first DNS response message, to generate the second DNS response message. That is, only the address of the target application server in the first DNS response message is reserved, to obtain the second DNS response message. The second DNS response message includes the address of the target application server.

In another example, when there are a plurality of first DNS response messages, the first user plane network element selects, from the plurality of first DNS response messages based on the address of the target application server included in the third information, one first DNS response message including the address of the target application server, and uses the first DNS response message as the second DNS response message. The second DNS response message includes the address of the target application server. In this example, the target application server may be determined by the first UPF, or may be determined by the SMF.

In another optional implementation, when the report message is the first DNS response message, or the report message includes the first DNS response message, the following step 510 is performed after step 507.

Step 510: The SMF sends a third DNS response message to the UE.

In an example, when the first user plane network element receives only one first DNS response message, where the first DNS response message includes only the address of the target application server, the report message is the first DNS response message. In this case, the third DNS response message is the first DNS response message.

In another example, when the first DNS response message includes addresses of a plurality of application servers, that is, the report message includes the addresses of the plurality of application servers, the SMF determines the address of the target application server, and deletes information about an application server other than the address of the target application server in the first DNS response message, to generate the third DNS response message. That is, only the address of the target application server in the first DNS response message is reserved, to obtain the third DNS response message. The third DNS response message includes the address of the target application server.

In another example, when the first DNS response message includes addresses of a plurality of application servers, and the report message includes the address of the target application server (that is, the first user plane network element determines the address of the target application server), the SMF deletes, based on the address of the target application server, information about an application server other than the address of the target application server in the first DNS response message, to generate the third DNS response message. That is, only the address of the target application server in the first DNS response message is reserved, to obtain the third DNS response message. The third DNS response message includes the address of the target application server.

In another example, when the report message is a plurality of first DNS response messages, the SMF determines the address of the target application server, selects, from the plurality of first DNS response messages, one first DNS response message including the address of the target application server, and uses the first DNS response message as the third DNS response message. The third DNS response message includes the address of the target application server.

In the foregoing example, in a process of discovering the application server, when the application server indicated by the first DNS response message received by the first UPF is located in the data network specified by the SMF, insertion of the local session anchor is triggered. Therefore, an application server near an access point of the terminal device is selected, so that a path between the terminal device and the application server is short.

FIG. 6 shows an example of another communication method. In this example, a scenario is as follows: UE has created a PDU session, and an SMF has not inserted a ULCL into the PDU session; or an SMF has inserted a ULCL, but has not inserted an L-PSA corresponding to a nearest application server that provides an application and that can be accessed by UE. In this example, an operator configures an anycast address for the application server. To be specific, a same anycast address may be configured for application servers that are located in different MECs and that provide a same service. After the UE obtains the anycast address of the application server, a data packet for sending a message includes the anycast address, and a network may select the nearest application server based on the anycast address. Specifically, a specific procedure of this example may include the following steps.

Step 601: The SMF sends first information to a first UPF. The first information indicates the first user plane network element to send a report message to the SMF when receiving a first DNS response message that meets a first condition.

In this example, the first information further indicates an address range of an anycast address where the report message needs to be sent. Correspondingly, the first condition is that an address of an application server indicated by the first DNS response message is included in information about the anycast address.

In an optional implementation, the first information indicates the first UPF to discover the first DNS response message and determine whether an IP address of the application server carried in the first DNS response message is included in an address range of an anycast IP address (anycast IP address) indicated by the first information. If the IP address of the application server carried in the first DNS response message is included in the address range of the anycast IP address indicated by the first information, the first information indicates the first UPF to send the report message to the SMF.

Specifically, the first information may include that the SMF provides, for the first UPF, a range of anycast addresses that need to be discovered. The range of anycast addresses may be one or more of the following: an anycast address list, an anycast address segment, an anycast address prefix plus a prefix length, or an anycast address prefix plus a subnet mask.

It should be noted that the first information may further indicate to send the report message when the address of the application server is any anycast address. In this case, the first information may not carry information about the anycast address that needs to be reported (that is, only indicates to send the report message when the address of the server is the anycast address), or carry information indicating any anycast address (that is, the first information includes the information indicating any anycast address).

In an optional implementation, the first information further indicates the first UPF to buffer the first DNS response message when sending the report message to the SMF. In other words, the first information further indicates the first UPF to buffer the first DNS response message when finding that the IP address of the application server is the anycast IP address (or a specified anycast IP address).

Step 602: The UE sends a DNS request message to the first UPF, where the DNS request message includes information about a DNS server.

Step 603: The first UPF sends the DNS request message to the DNS server indicated by the DNS request message.

Step 604: The first UPF receives the first DNS response message sent by the DNS server.

Step 605: The first UPF sends the report message to the SMF when determining that the first DNS response message meets the first condition. The report message includes information about the application server indicated by the first DNS response message.

Specifically, when determining that the address of the application server indicated by the first DNS response message is the anycast address indicated by the first information, the first UPF sends the report message to the SMF.

For example, if the IP address of the application server in the first DNS response message is the anycast IP address, the SMF provides, in step 601, a list (or a range) of anycast IP addresses that need to be discovered, and the IP address of the application server is in the list, the first UPF sends the report message to the SMF, where the information about the application server included in the report message is the anycast IP address of the application server.

In an optional implementation, the first UPF buffers the first DNS response message when sending the report message to the SMF.

In another optional implementation, the report message is the first DNS response message. To be specific, when the first condition is met, the first UPF directly sends the first DNS response message to the SMF. In this implementation, because the first DNS response message includes the information about the application server, the report message may not additionally carry the information about the application server.

Step 606: The SMF inserts an L-PSA based on the report message.

Specifically, the SMF may determine, based on the anycast address of the application server included in the report message, whether to insert the L-PSA.

In an optional implementation, the SMF obtains routing information of the anycast address. The routing information of the anycast address includes information about at least one UPF corresponding to the anycast address, or a DNAI corresponding to the anycast address. The SMF determines the local session anchor based on access information of the UE and the routing information of the anycast address. Optionally, if the routing information is the DNAI corresponding to the anycast address, the SMF may further determine, based on the DNAI, the session anchor that needs to be inserted.

For example, when determining, based on the access information of the terminal device and the routing information of the anycast address, that an MEC that can be currently accessed by the terminal device supports the anycast address and no local session anchor connected to the MEC is inserted, the SMF determines that the L-PSA needs to be inserted. In this way, a data packet that is subsequently sent by the UE and whose destination address is the anycast address can be routed to the nearest MEC. If in the current access information of the UE, there are a plurality of corresponding MECs that can support the anycast address, the SMF may select one of the MECs, to insert an L-PSA connected to the MEC.

To support this function, the SMF may obtain the MECs that support the anycast address. The information (namely, the MECs that support the anycast address) may be configured in the SMF.

In an optional implementation, if no ULCL UPF is inserted into a PDU session path of the UE, the SMF determines that the ULCL UPF needs to be inserted, and inserts the ULCL UPF.

In an optional implementation, when the first information indicates the first UPF to buffer the first DNS response message, the following steps 607 and 608 are performed after step 606.

Step 607: The SMF sends third information to the first UPF, where the third information indicates the first UPF to send a second DNS response message to the UE.

Specifically, the second DNS response message is the first DNS response message buffered by the first UPF.

Step 608: The first UPF sends the second DNS response message to the UE.

In another optional implementation, when the report message is the first DNS response message, or the report message includes the first DNS response message, the following step 609 is performed after step 606.

Step 609: The SMF sends a third DNS response message to the UE.

The third DNS response message is the report message received by the SMF, namely, the first DNS response message.

Subsequently, when the UE sends a data packet to the application server, a destination address of the data packet is the anycast IP address of the application server. The data packet may be sent by the ULCL/L-PSA to an application server in the MEC.

In this example, if no L-PSA connected to an MEC supporting a nearby application server or no ULCL is inserted into the PDU session of the UE, the data packet is routed to a remote PSA even if an application server exists locally, resulting in route recurvation. In this example, insertion of the L-PSA may be triggered when the UE resolves the IP address of the application server through the DNS server, so that the data packet of the UE can be sent to the nearby application server.

It should be noted that there may be another possible manner. The SMF indicates the first UPF to discover a data packet whose destination address is the anycast IP address. If the first UPF finds the data packet whose destination address is the anycast IP address, the first UPF sends the report message to the SMF, where the report message includes the anycast IP address. The SMF determines, based on the anycast IP address, whether the ULCL needs to be inserted. In other words, in this method, whether to insert the ULCL is not determined based on a DNS response message, but is determined based on the destination address of the data packet. A disadvantage of this method is that route recurvation occurs in the first data packet whose destination address is the anycast IP address, and the data packet may not be routed (because the first UPF does not have a route of the anycast IP address).

Figure 7:
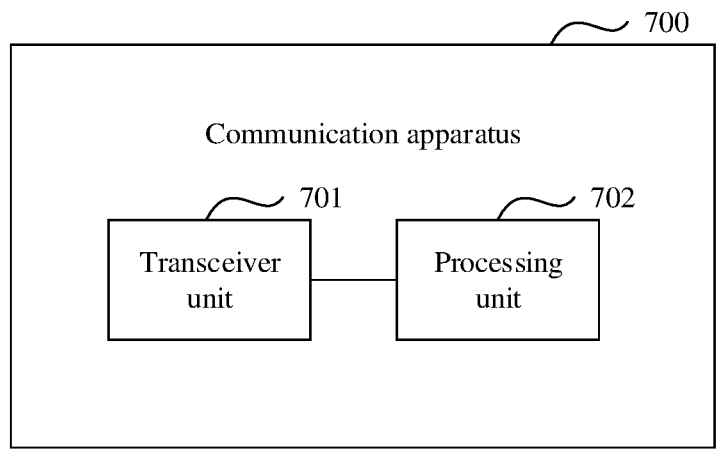
FIG. 7 is a schematic diagram of a structure of a communication apparatus according to this application.

Based on the foregoing embodiments, an embodiment of this application further provides a communication apparatus. Refer to FIG. 7. The communication apparatus 700 may include a transceiver unit 701 and a processing unit 702. The transceiver unit 701 is configured to receive information (a message or data) or send information (a message or data) by the communication apparatus 700, and the processing unit 702 is configured to control and manage an action of the communication apparatus 700. The processing unit 702 may further control a step performed by the transceiver unit 701.

For example, the communication apparatus 700 may be the SMF in the foregoing embodiment, and may be specifically a processor, a chip, a chip system, or a functional module in the SMF. Alternatively, the communication apparatus 700 may be the first user plane network element (for example, the first UPF) in the foregoing embodiment, and may be specifically a processor, a chip, a chip system, or a functional module in the first user plane network element.

In an embodiment, when the communication apparatus 700 is configured to implement functions of the SMF in the embodiments shown in FIG. 4 to FIG. 6, the communication apparatus 700 may specifically include: the transceiver unit 701, configured to send first information to a first user plane network element, where the first information indicates the first user plane network element to send a report message to the SMF when receiving a first domain name server DNS response message that meets a first condition, and the report message includes information about an application server indicated by the first DNS response message or information about a data network corresponding to the application server; and the processing unit 702, configured to insert a local session anchor based on the report message, where the transceiver unit 701 is further configured to receive the report message sent by the first user plane network element.

In an optional implementation, the first condition is that an internet protocol IP address of the application server indicated by the first DNS response message belongs to an address range of the data network included in the first information. Alternatively, the first information further indicates information about an anycast address where the report message needs to be sent, and the first condition is that an address of the application server indicated by the first DNS response message is included in the information about the anycast address.

In an implementation, the report message is the first DNS response message.

In another implementation, the first information further indicates the first user plane network element to buffer the first DNS response message.

In an optional implementation, the transceiver unit 701 is further configured to send third information to the first user plane network element after the processing unit 702 inserts the local session anchor, where the third information indicates the first user plane network element to send a second DNS response message to a terminal device. The second DNS response message indicates a target application server selected for the terminal device, and the second DNS response message is the first DNS response message, or the second DNS response message is determined based on the first DNS response message.

In another optional implementation, the transceiver unit 701 is further configured to send a third DNS response message to a terminal device after the processing unit 702 inserts the local session anchor, where the third DNS response message indicates a target application server selected for the terminal device, and the third DNS response message is the first DNS response message, or the third DNS response message is determined based on the first DNS response message.

In a specific implementation, the transceiver unit 701 is further configured to send second information to the first user plane network element. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message.

In an optional implementation, the transceiver unit 701 is further configured to obtain location information of the terminal device from an AMF before sending the second information to the first user plane network element. The processing unit 702 is further configured to determine the access information of the terminal device based on the location information of the terminal device.

Specifically, the second information further indicates priorities of the access information of the terminal device, so that the first user plane network element selects the application server for the terminal device based on the priorities of the access information of the terminal device.

Optionally, when the report message includes information about a plurality of application servers, the processing unit 702 is further configured to determine a target application server, where the third information includes an address of the target application server.

In an example, when inserting the local session anchor based on the report message, the processing unit 702 is specifically configured to: determine, based on the information about the application server, a DNAI of the data network in which the application server is located, to determine the to-be-inserted local session anchor; or determine the to-be-inserted local session anchor based on a DNAI corresponding to the information about the data network.

In another example, the processing unit 702 is further configured to obtain routing information of the anycast address, where the routing information of the anycast address includes information about at least one network element that implements a user plane function and that corresponds to the anycast address, or a DNAI of a data network corresponding to the anycast address; and determine the local session anchor based on access information of the terminal device and the routing information of the anycast address.

In an embodiment, when the communication apparatus 700 is configured to implement functions of the first user plane network element (for example, the first UPF) in the embodiments shown in FIG. 4 to FIG. 6, the communication apparatus 700 may specifically include: the transceiver unit 701, configured to: receive first information from an SMF, where the first information indicates the first user plane network element to send a report message to the SMF when receiving a first domain name server DNS response message that meets a first condition, and the report message includes information about an application server indicated by the first DNS response message or information about a data network corresponding to the application server; and receive the first DNS response message; and the processing unit 702, configured to determine that the first DNS response message meets the first condition, where the transceiver unit 701 is further configured to send the report message to the SMF when the processing unit 702 is configured to determine that the first DNS response message meets the first condition.

In a specific implementation, the first information further includes an address range of a data network where the report message needs to be sent, and the first condition is that an IP address of the application server indicated by the first DNS response message belongs to the address range. Alternatively, the first information further indicates information about an anycast address where the report message needs to be sent, and the first condition is that an address of the application server indicated by the first DNS response message is included in the information about the anycast address.

In an implementation, the report message is the first DNS response message.

In another implementation, the first information further indicates the first user plane network element to buffer the first DNS response message.

In an optional implementation, the transceiver unit 701 is further configured to: receive third information from the SMF, where the third information indicates the first user plane network element to send a second DNS response message to a terminal device; and send the second DNS response message to the terminal device, where the second DNS response message indicates a target application server selected for the terminal device, and the second DNS response message is the first DNS response message, or the first DNS response message is determined based on the second DNS response message.

In a specific implementation, the transceiver unit 701 is further configured to receive second information from the SMF. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message.

For example, the second information further indicates priorities of the access information of the terminal device, so that the first user plane network element selects the application server for the terminal device based on the priorities of the access information of the terminal device.

In an optional implementation, the processing unit 702 is further configured to add the access information of the terminal device to a DNS request message received from the terminal device, to obtain a new DNS request message. Alternatively, the processing unit 702 is further configured to determine a DNS server corresponding to the access information of the terminal device. The transceiver unit 701 is further configured to send the DNS request message to the DNS server corresponding to the access information of the terminal device.

In an example, the access information of the terminal device is a plurality of pieces of access information. In this case, when adding the access information of the terminal device to the DNS request message received from the terminal device, to obtain the new DNS request message, the processing unit 702 is specifically configured to: add each piece of access information to the DNS request message, to obtain a plurality of new DNS request messages; or add the plurality of pieces of access information to the DNS request message.

In another example, when determining the DNS server corresponding to the access information of the terminal device, the processing unit 702 is specifically configured to determine a DNS server corresponding to each of the plurality of pieces of access information. When sending the DNS request message to the DNS server corresponding to the access information of the terminal device, the transceiver unit 701 is specifically configured to send the DNS request message to a DNS server corresponding to each piece of access information.

In an optional implementation, the processing unit 702 is further configured to: when obtaining information about a plurality of application servers, determine a target application server based on priorities of access information of access networks corresponding to the plurality of application servers. The report message further includes information about the target application server or access network information corresponding to the target application server.

Optionally, the first message includes an address of the target application server. The second DNS response message includes the address of the target application server.

In an optional implementation, the processing unit 702 is further configured to buffer the first DNS response message when the transceiver unit 701 sends the report message to the SMF.

It should be noted that, in embodiments of this application, division into the units is an example, and is merely logical function division. During actual implementation, another division manner may be used. Functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for indicating a computer device (which may be a personal computer, a server, or a network device) or a processor to perform all or some of the steps of the method described in embodiments of this application. The foregoing storage medium includes: any medium that can store program code, such as a USB flash drive, a removable hard disk, a read-only memory (ROM), a random access memory (RAM), a magnetic disk, or an optical disc.

Figure 8:
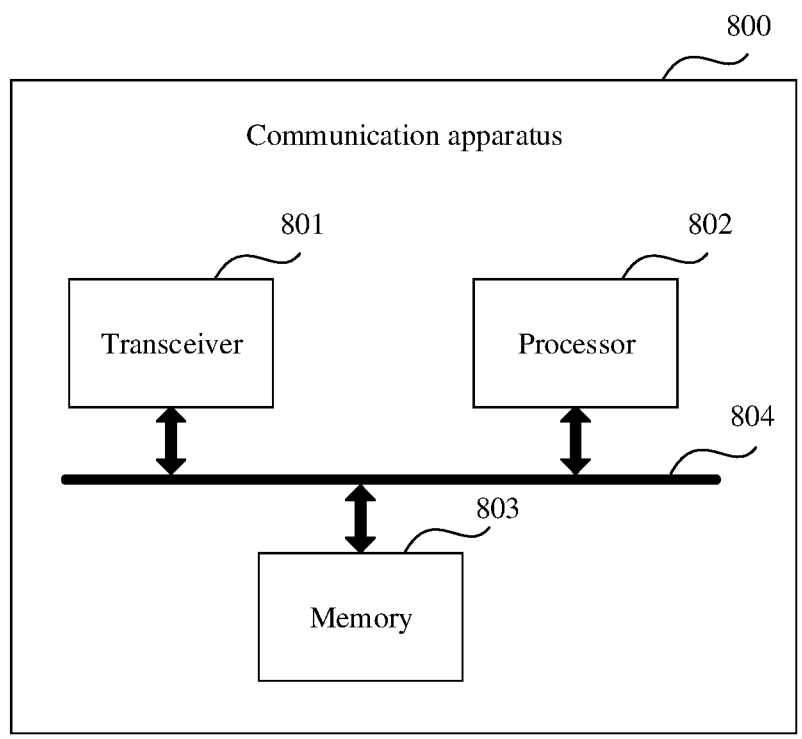
FIG. 8 is a diagram of a structure of a communication apparatus according to this application.

Based on the foregoing embodiments, an embodiment of this application further provides a communication apparatus. Refer to FIG. 8. The communication apparatus 800 may include a transceiver 801 and a processor 802. Optionally, the communication apparatus 800 may further include a memory 803. The memory 803 may be disposed inside the communication apparatus 800, or may be disposed outside the communication apparatus 800. The processor 802 may control the transceiver 801 to receive and send information or data.

Specifically, the processor 802 may be a central processing unit (CPU), a network processor (NP), or a combination of a CPU and an NP. The processor 802 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The transceiver 801, the processor 802, and the memory 803 are connected to each other. Optionally, the transceiver 801, the processor 802, and the memory 803 are connected to each other by using a bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is for representing the bus in FIG. 8, but this does not mean that there is only one bus or only one type of bus.

In an optional implementation, the memory 803 is configured to store a program and the like. Specifically, the program may include program code, and the program code includes computer operation instructions. The memory 803 may include a RAM, and may further include a non-volatile memory, for example, one or more magnetic disk memories. The processor 802 executes the application program stored in the memory 803, to implement the foregoing function, so that a function of the communication apparatus 800 is implemented.

For example, the communication apparatus 800 may be the SMF in the foregoing embodiment, or may be the first user plane network element (for example, the first UPF) in the foregoing embodiment.

In an embodiment, when the communication apparatus 800 is configured to implement functions of the SMF in the embodiments shown in FIG. 4 to FIG. 6, the communication apparatus 800 may specifically include: the transceiver 801, configured to send first information to a first user plane network element, where the first information indicates the first user plane network element to send a report message to the SMF when receiving a first domain name server DNS response message that meets a first condition, and the report message includes information about an application server indicated by the first DNS response message or information about a data network corresponding to the application server; and the processor 802, configured to insert a local session anchor based on the report message, where the transceiver 801 is further configured to receive the report message sent by the first user plane network element.

In an optional implementation, the first condition is that an internet protocol IP address of the application server indicated by the first DNS response message belongs to an address range of the data network included in the first information. Alternatively, the first information further indicates information about an anycast address where the report message needs to be sent, and the first condition is that an address of the application server indicated by the first DNS response message is included in the information about the anycast address.

In an implementation, the report message is the first DNS response message.

In another implementation, the first information further indicates the first user plane network element to buffer the first DNS response message.

In an optional implementation, the transceiver 801 is further configured to send third information to the first user plane network element after the processor 802 inserts the local session anchor, where the third information indicates the first user plane network element to send a second DNS response message to a terminal device. The second DNS response message indicates a target application server selected for the terminal device, and the second DNS response message is the first DNS response message, or the second DNS response message is determined based on the first DNS response message.

In another optional implementation, the transceiver 801 is further configured to send a third DNS response message to a terminal device after the processor 802 inserts the local session anchor, where the third DNS response message indicates a target application server selected for the terminal device, and the third DNS response message is the first DNS response message, or the third DNS response message is determined based on the first DNS response message.

In a specific implementation, the transceiver 801 is further configured to send second information to the first user plane network element. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message.

In an optional implementation, the transceiver 801 is further configured to obtain location information of the terminal device from an AMF before sending the second information to the first user plane network element. The processor 802 is further configured to determine the access information of the terminal device based on the location information of the terminal device.

Specifically, the second information further indicates priorities of the access information of the terminal device, so that the first user plane network element selects the application server for the terminal device based on the priorities of the access information of the terminal device.

Optionally, when the report message includes information about a plurality of application servers, the processor 802 is further configured to determine a target application server, where the third information includes an address of the target application server.

In an example, when inserting the local session anchor based on the report message, the processor 802 is specifically configured to: determine, based on the information about the application server, a DNAI of the data network in which the application server is located, to determine the to-be-inserted local session anchor; or determine the to-be-inserted local session anchor based on a DNAI corresponding to the information about the data network.

In another example, the processor 802 is further configured to obtain routing information of the anycast address, where the routing information of the anycast address includes information about at least one network element that implements a user plane function and that corresponds to the anycast address, or a DNAI of a data network corresponding to the anycast address; and determine the local session anchor based on access information of the terminal device and the routing information of the anycast address.

In an embodiment, when the communication apparatus 800 is configured to implement functions of the first user plane network element (for example, the first UPF) in the embodiments shown in FIG. 4 to FIG. 6, the communication apparatus 800 may specifically include: the transceiver 801, configured to: receive first information from an SMF, where the first information indicates the first user plane network element to send a report message to the SMF when receiving a first domain name server DNS response message that meets a first condition, and the report message includes information about an application server indicated by the first DNS response message or information about a data network corresponding to the application server; and receive the first DNS response message; and the processor 802, configured to determine that the first DNS response message meets the first condition, where the transceiver 801 is further configured to send the report message to the SMF when the processor 802 is configured to determine that the first DNS response message meets the first condition.

In a specific implementation, the first information further includes an address range of a data network where the report message needs to be sent, and the first condition is that an IP address of the application server indicated by the first DNS response message belongs to the address range. Alternatively, the first information further indicates information about an anycast address where the report message needs to be sent, and the first condition is that an address of the application server indicated by the first DNS response message is included in the information about the anycast address.

In an implementation, the report message is the first DNS response message.

In another implementation, the first information further indicates the first user plane network element to buffer the first DNS response message.

In an optional implementation, the transceiver 801 is further configured to: receive third information from the SMF, where the third information indicates the first user plane network element to send a second DNS response message to a terminal device; and send the second DNS response message to the terminal device, where the second DNS response message indicates a target application server selected for the terminal device, and the second DNS response message is the first DNS response message, or the first DNS response message is determined based on the second DNS response message.

In a specific implementation, the transceiver 801 is further configured to receive second information from the SMF. The second information indicates access information of the terminal device. The access information of the terminal device indicates a location of an access point that can be accessed by the terminal device. For example, the access information of the terminal device is a data network access identifier DNAI corresponding to a data network that can be accessed by the terminal device, or an address of a data network that can be accessed by the terminal device (where the address may be one or more addresses in an address range supported by the data network). Alternatively, the access information may be address information of a UPF corresponding to a data network that can be accessed by the terminal device (for example, an interface address of the UPF, or an address that is configured in the UPF and that is used to provide communication for the terminal device, for example, an address used to perform NAT translation). The access information of the terminal device is used by the first user plane network element to select the application server for the terminal device. The information about the application server is included in the first DNS response message.

For example, the second information further indicates priorities of the access information of the terminal device, so that the first user plane network element selects the application server for the terminal device based on the priorities of the access information of the terminal device.

In an optional implementation, the processor 802 is further configured to add the access information of the terminal device to a DNS request message received from the terminal device, to obtain a new DNS request message. Alternatively, the processor 802 is further configured to determine a DNS server corresponding to the access information of the terminal device. The transceiver 801 is further configured to send the DNS request message to the DNS server corresponding to the access information of the terminal device.

In an example, the access information of the terminal device is a plurality of pieces of access information. In this case, when adding the access information of the terminal device to the DNS request message received from the terminal device, to obtain the new DNS request message, the processor 802 is specifically configured to: add each piece of access information to the DNS request message, to obtain a plurality of new DNS request messages; or add the plurality of pieces of access information to the DNS request message.

In another example, when determining the DNS server corresponding to the access information of the terminal device, the processor 802 is specifically configured to determine a DNS server corresponding to each of the plurality of pieces of access information. When sending the DNS request message to the DNS server corresponding to the access information of the terminal device, the transceiver 801 is specifically configured to send the DNS request message to a DNS server corresponding to each piece of access information.

In an optional implementation, the processor 802 is further configured to: when obtaining information about a plurality of application servers, determine a target application server based on priorities of access information of access networks corresponding to the plurality of application servers. The report message further includes information about the target application server or access network information corresponding to the target application server.

Optionally, the first message includes an address of the target application server. The second DNS response message includes the address of the target application server.

In an optional implementation, the processor 802 is further configured to buffer the first DNS response message when the transceiver 801 sends the report message to the SMF.

It should be noted that all the functions performed by the first user plane network element in the foregoing embodiment may be performed by the first network element, and a specific procedure performed by the first network element is not described in detail again. In this embodiment of this application, the first network element may be integrated into the first user plane network element (first UPF network element), or the first network element may be a network element independent of a user plane network element, or the first network element may be a local DNS resolver (local DNS resolver, LDNSR) or the like.

Figure 9A:
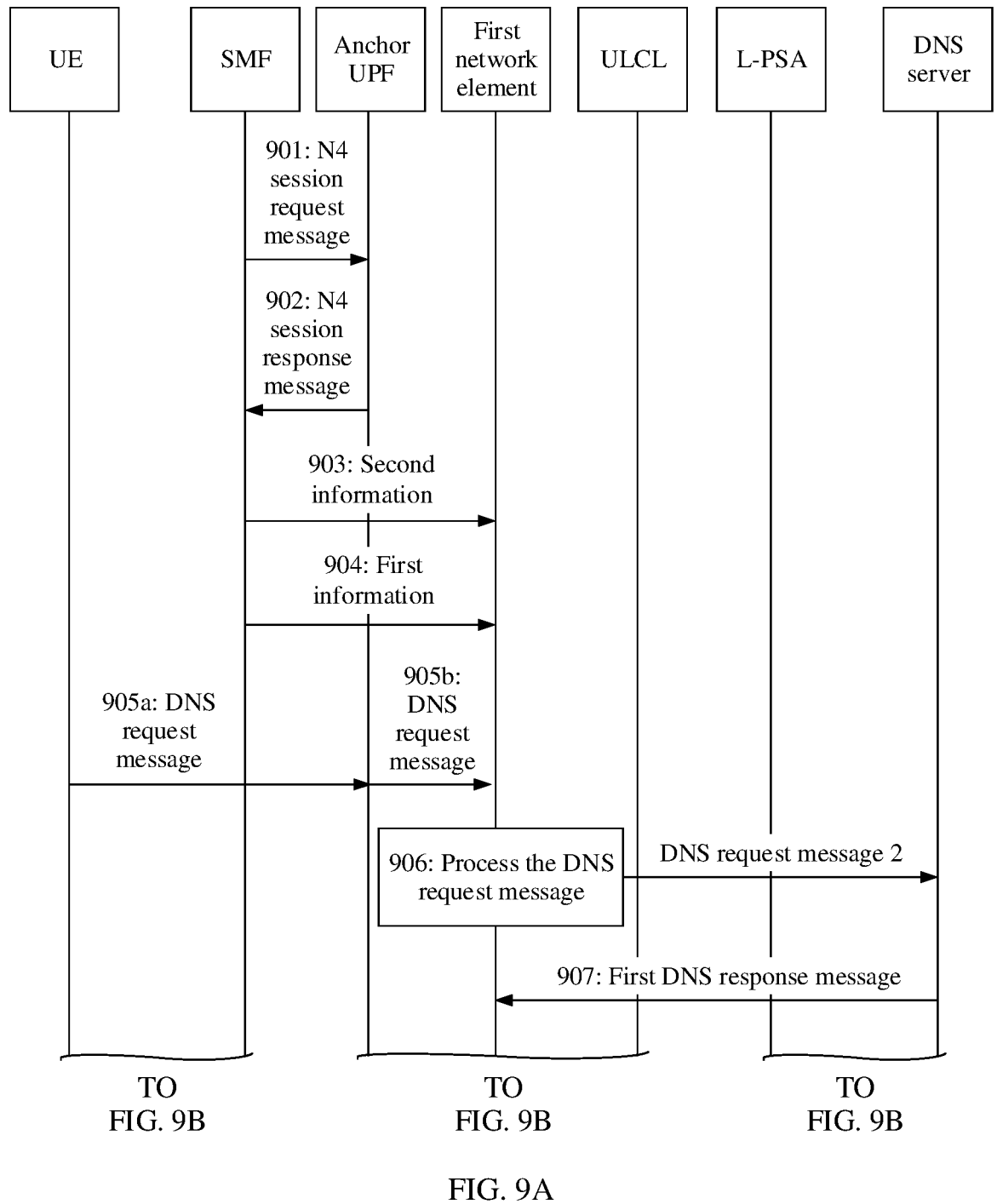
FIG. 9A and FIG. 9B are a flowchart of an example of another communication method according to this application.
Figure 9B:
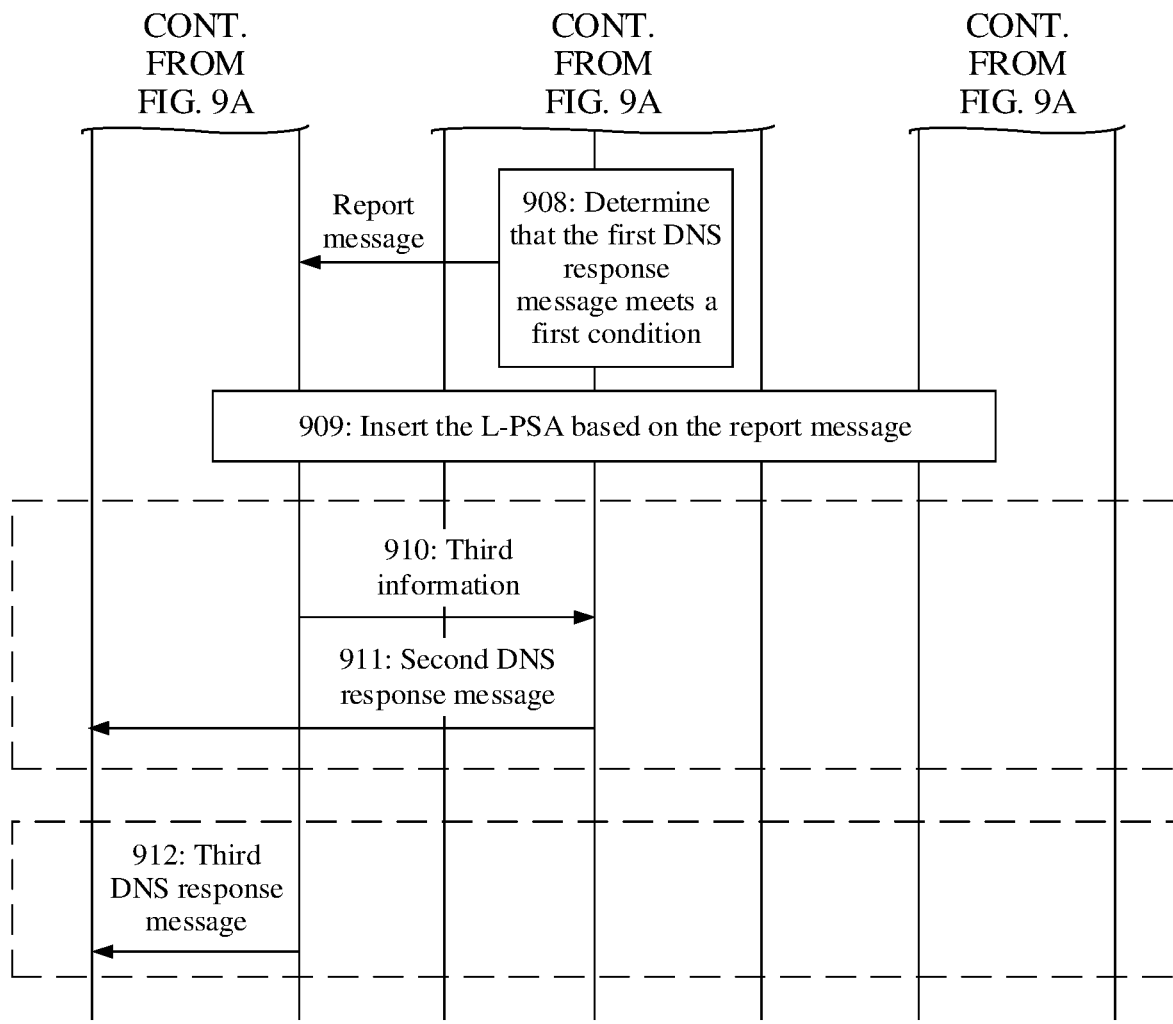

As shown in FIG. 9A and FIG. 9B, this application further shows an example of another communication method. In this example, a scenario is as follows: UE has created a PDU session, and an SMF has not inserted a ULCL into the PDU session; or an SMF has inserted a ULCL, but has not inserted an L-PSA corresponding to a nearest application server that provides an application and that can be accessed by UE. In this example, the first network element is a network element that processes a DNS message, and the first network element and an anchor UPF corresponding to the PDU session are not a same network element. In this case, a DNS request message sent by the UE is sent to the anchor UPF network element, and then sent to the first network element by the anchor UPF network element. In this embodiment, if the anchor UPF network element supports NAT translation, when sending the DNS request message to the first network element, the anchor UPF network element replaces a source address (namely, an IP address of the UE, for example, a private IP address) in the data packet with a new IP address (for example, a public IP address). Optionally, the anchor UPF network element further replaces a source port number in the data packet, that is, replaces the source port number in the data packet with a new port number. In this embodiment, the anchor UPF network element may reserve, for the DNS message, an address and a port number that are obtained through NAT translation, and send the reserved address and port number to the SMF. The SMF sends the reserved address and port number to the first network element, so that the first network element can determine, based on the address and port number that are obtained through NAT translation, a PDU session corresponding to the DNS request. Specifically, a specific procedure of this example may include the following steps.

Step 901: The SMF sends an N4 session request message to the anchor UPF.

Optionally, in the N4 session request message, the SMF requests the anchor UPF network element to reserve, for the terminal device, an IP address and an optional port number that are used for NAT translation. In an optional implementation, the SMF may indicate that the reserved IP address and port number are used only to perform NAT translation on the DNS message of the terminal device. In other words, the SMF requests the anchor UPF network element to reserve, for the DNS message of the terminal device, the IP address and the optional port number that are used for NAT translation. The N4 session request message may be sent by the SMF to a UPF in a PDU session establishment process.

Optionally, if the SMF determines that the anchor UPF performs NAT translation on the session, the SMF requests the anchor UPF network element to allocate, to the DNS message of the terminal device, the IP address and the optional port number that are used for NAT translation. For example, the SMF may determine, based on a UE IP address of the session, that the anchor UPF is to perform NAT translation on the session. For example, the UE IP address is a private network address. Optionally, the anchor UPF may send, to the SMF, an indication indicating that the anchor UPF supports NAT translation, and the SMF determines, based on the indication, that the anchor UPF is to perform NAT translation on the session. In addition, there are other possible cases. This is not limited in this application.

It should be noted that if the anchor UPF allocates only the IP address used for NAT translation, but does not allocate the port number, the IP address may also be actually used to perform NAT translation on a message other than the DNS message of the terminal device.

Step 902: The anchor UPF sends an N4 session response message to the SMF.

In the N4 session response message, the anchor UPF sends, to the SMF, the IP address and the optional port number that are reserved for the DNS message and that are used for NAT translation.

Optionally, when receiving an indication that the SMF requests the anchor UPF to reserve, for the terminal device, the IP address and the optional port number that are used for NAT translation, the anchor UPF reserves, for the DNS message, the IP address and the optional port number that are used for NAT translation.

For step 903, refer to related descriptions of step 501. Different from step 501, in step 903, the second information further includes the IP address and the optional port number that are reserved for the terminal device by the anchor UPF and that are used for NAT translation.

Step 904 is the same as step 502. For details, refer to related descriptions of step 502.

Step 905*a*: The anchor UPF receives the DNS request message.

Specifically, the anchor UPF receives the DNS request message from the UE.

For the DNS request message, the source address is the IP address of the UE (UE IP address), and the source port number is a port number allocated by the UE to the DNS request message.

The anchor UPF performs NAT processing on the DNS request message by using the IP address and the optional port number that are obtained through NAT translation and that are reserved for the DNS message of the terminal device.

For the DNS request message processed through NAT translation, the source address is the reserved IP address obtained through NAT translation, and the source port number is the reserved port number.

For step 905*b*, refer to related descriptions of step 503.

Different from step 503, in step 905*b*, the first network element matches the source address of the DNS request message with the second information, to determine access information of the terminal device corresponding to the DNS request message. For example, corresponding to the access information of the terminal device, an IP address obtained through NAT translation is an IP 1, and a port number obtained through NAT translation is a port number 1. If for the DNS request message, the source address is also the IP 1, and the source port number is also the port number 1, the access information is access information corresponding to the DNS request message.

For step 906 and step 907, refer to related descriptions of step 504 and step 505.

For step 908, refer to related descriptions of step 506. Different from step 506, in step 908, the report message may further include the IP address and the optional port number that are obtained through NAT translation.

For step 909, refer to related descriptions of step 507. Different from step 507, in step 909, if the report message includes the IP address and the optional port number that are obtained through NAT translation, the SMF determines a corresponding PDU session based on the IP address and the optional port number that are obtained through NAT translation, and inserts the L-PSA into the PDU session. In step 902, the SMF stores, in a PDU session context, the IP address and the optional port number that are obtained through NAT translation.

For step 910 to step 912, refer to related descriptions of step 508 to step 510. A difference is as follows: In step 911, the second DNS response message is sent to the anchor UPF network element. Then, the anchor UPF network element performs NAT processing on the data packet, that is, replaces a destination address (namely, the IP address obtained through NAT translation) in the data packet with the UE IP address, and optionally replaces a destination port number (namely, the port number obtained through NAT translation) in the data packet with the source port number in the original DNS request message sent by the UE.

It should be noted that one or more first network elements may be deployed during actual deployment. In this case, when creating the PDU session for the terminal device, the SMF needs to select a first network element from the one or more first network elements, use the first network element as the first network element that serves the PDU session, use an address of the first network element as an address of a DNS server of the PDU session, and send the address to the terminal device, so that the DNS request message of the terminal device is sent to the selected first network element. In a possible implementation, the SMF receives a message from each of the one or more first network elements. The message includes at least one of a DNN, single network slice selection assistance information (S-NSSAI), and a service range that are supported by the first network element. Alternatively, the message includes an identifier of the first network element. The SMF obtains, based on the identifier of the first network element from a network element that implements a network repository function (NRF), at least one of a DNN, S-NSSAI, and a service range that are supported by the first network element. The SMF determines, based on at least one of the DNN and the S-NSSAI that correspond to the session, and information about the UPF selected for the PDU session, a first network element from the one or more first network elements, and uses the first network element as the first network element corresponding to the PDU session. The service range may be a tracking area list, a DNAI list, a UPF list, a service area identifier, or the like. That the SMF determines the first network element based on the information about the UPF includes: The SMF determines that the UPF is within the service range of the first network element. The SMF sends the first information and/or the second information to the first network element corresponding to the PDU session. After receiving a success response message of the first network element, the SMF uses the address of the first network element as the address of the DNS server, and sends the address to the terminal device.

It should be noted that this embodiment may also be applied to a scenario corresponding to the embodiment shown in FIG. 6. Corresponding to the scenario of the embodiment shown in FIG. 6, in the embodiment shown in FIG. 9A and FIG. 9B, "refer to descriptions of step 501" needs to be modified to "refer to descriptions of step 601"; "refer to descriptions of step 503" needs to be replaced with "refer to descriptions of step 602"; "refer to descriptions of step 504" needs to be replaced with "refer to descriptions of step 603"; "refer to descriptions of step 505" needs to be replaced with "refer to descriptions of step 604"; "refer to descriptions of step 506" needs to be replaced with "refer to descriptions of step 605"; "refer to descriptions of step 507" needs to be replaced with "refer to descriptions of step 606"; "refer to descriptions of step 508" needs to be replaced with "refer to descriptions of step 607"; and "refer to descriptions of step 510" needs to be replaced with "refer to descriptions of step 609".

It should be noted that a function of the first network element in the embodiment shown in FIG. 9A and FIG. 9B is integrated into the first UPF network element in the embodiment shown in FIG. 5 and the embodiment shown in FIG. 6. The first network element in this embodiment corresponds to the first user plane network element in the embodiment shown in FIG. 4. The first network element may not process any user plane data packet other than the DNS message.

It should be noted that a NAT function may alternatively be performed by an independent network element instead of the anchor UPF network element. In this case, the anchor UPF network element in steps 901 and 902 is replaced with the independent network element. Herein, an entity performing the NAT function is referred to as a first NAT translation network element. The first NAT translation network element may be located in the anchor UPF, or may be an independent network element.

Figure 10:
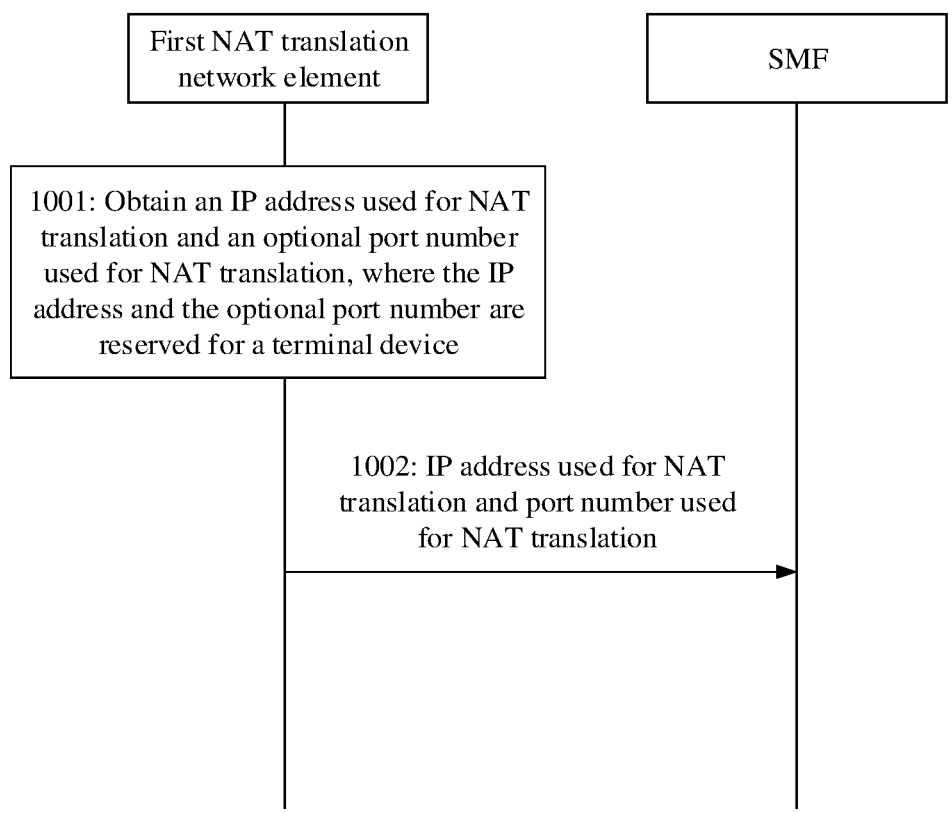
FIG. 10 is a flowchart of another communication method according to this application.

An embodiment of this application further provides a communication method. The communication method is applicable to the communication system shown in FIG. 2. Refer to FIG. 10. A specific procedure of the method may include the following steps.

Step 1001: A first NAT translation network element obtains an IP address used for NAT translation and an optional port number used for NAT translation, where the IP address and the optional port number are reserved for a terminal device.

In an implementation, the first NAT translation network element reserves, for a DNS message of the terminal device, the IP address used for NAT translation and the optional port number used for NAT translation.

Step 1002: The first NAT translation network element sends, to an SMF, the IP address used for NAT translation and the port number used for NAT translation.

In an optional implementation, the first NAT translation network element receives a request message of the SMF, where the request message indicates the first NAT translation network element to reserve, for the terminal device, the IP address used for NAT translation and the port number used for NAT translation.

In an optional implementation, the first NAT translation network element receives a request message of the SMF, where the request message indicates the first NAT translation network element to reserve, for the DNS message of the terminal device, the IP address used for NAT translation and the port number used for NAT translation.

In an optional implementation, the first NAT translation network element receives the DNS message of the terminal device; and processes the DNS message based on the IP address used for NAT translation and the port number used for NAT translation.

That the first NAT translation network element processes the DNS message specifically includes the following steps.

The first NAT translation network element receives a DNS request message sent by the terminal device, and replaces a source address (namely, an IP address of the terminal device) in the DNS request message sent by the terminal device with the reserved IP address used for NAT translation. Optionally, the first NAT translation network element replaces a source port number in the DNS request message with the reserved port number used for NAT translation. The first NAT translation network element sends the DNS request message used for NAT translation.

The first NAT translation network element receives a DNS response message, where a destination address in the DNS response message is the IP address used for NAT translation. The first NAT translation network element replaces the destination address in the DNS response message with the IP address of the terminal device. Optionally, the first NAT translation network element replaces a destination port number (the port number used for NAT translation) in the DNS response message with an original port number of the terminal device (namely, the source port number in the original DNS request message).

Based on the foregoing embodiments, an embodiment of this application further provides a communication apparatus. Similarly, refer to FIG. 7. For example, when the communication apparatus 700 is configured to implement a function of the first NAT translation network element in the embodiment shown in FIG. 10, the communication apparatus 700 may specifically include:

the processing unit 702, configured to obtain an internet protocol IP address used for NAT translation and an optional port number used for NAT translation, where the IP address and the optional port number are reserved for a terminal device; and the transceiver unit 701, configured to send, to an SMF, the IP address used for NAT translation and the port number used for NAT translation.

In an optional implementation, the transceiver unit 701 is further configured to receive a request message of the SMF, where the request message indicates to reserve, for the terminal device, the IP address used for NAT translation and the optional port number used for NAT translation.

In an optional implementation, the transceiver unit 701 is further configured to receive a DNS message of the terminal device; and the processing unit 702 is further configured to process the DNS message based on the IP address used for NAT translation and the optional port number used for NAT translation.

Based on the foregoing embodiments, an embodiment of this application further provides a communication apparatus. Similarly, refer to FIG. 8. For example, when the communication apparatus 800 is configured to implement a function of the first NAT translation network element in the embodiment shown in FIG. 10, the communication apparatus 800 may specifically include: the processor 802, configured to obtain an internet protocol IP address used for NAT translation and an optional port number used for NAT translation, where the IP address and the optional port number are reserved for a terminal device; and the transceiver 801, configured to send, to an SMF, the IP address used for NAT translation and the optional port number used for NAT translation.

In an optional implementation, the transceiver 801 is further configured to receive a request message of the SMF, where the request message indicates to reserve, for the terminal device, the IP address used for NAT translation and the optional port number used for NAT translation.

In an optional implementation, the transceiver 801 is further configured to receive a DNS message of the terminal device; and the processor 802 is further configured to process the DNS message based on the reserved IP address used for NAT translation and the port number used for NAT translation.

Based on the foregoing embodiments, an embodiment of this application provides a communication system. The communication system may include the SMF, the first user plane network element, and the like in the foregoing embodiments.

An embodiment of this application further provides a computer-readable storage medium. The computer-readable storage medium is configured to store a computer program. When the computer program is executed by a computer, the computer may implement any communication method provided in the foregoing method embodiments.

An embodiment of this application further provides a computer program product. The computer program product is configured to store a computer program. When the computer program is executed by a computer, the computer may implement any communication method provided in the foregoing method embodiments.

An embodiment of this application further provides a chip. The chip includes a processor and a communication interface. The processor is coupled to a memory, and is configured to invoke a program in the memory, to enable the chip to implement any communication method provided in the foregoing method embodiments.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or another programmable data processing device, to generate computer-implemented processing. Therefore, the instructions executed on the computer or the another programmable data processing device provide steps for implementing a specified function in one or more processes in the flowcharts and/or in one or more blocks in the block diagrams.

Clearly, a person skilled in the art can make various modifications and variations to this application without departing from the protection scope of this application. In this way, if these modifications and variations to this application fall within the scope of the claims of this application and their equivalent technologies, this application is also intended to cover these modifications and variations.

What is claimed is:

1. A method, comprising:
    sending, by a session management network element, first information to a first network element, wherein the first information indicates to the first network element to send a report message to the session management network element when receiving a first domain name server (DNS) response message that meets a first condition, and the report message comprises information about an application server indicated by the first DNS response message; and
    inserting, by the session management network element, a local session anchor based on the report message.

2. The method according to claim 1, wherein:
    the first information further comprises an address range to use to send the report message, and the first condition is that an internet protocol (IP) address of the application server indicated by the first DNS response message belongs to the address range.

3. The method according to claim 2, wherein the first information further indicates to the first network element to buffer the first DNS response message.

4. The method according to claim 2, wherein after inserting, by the session management network element, the local session anchor, the method further comprises:
    sending, by the session management network element, third information to the first network element, wherein the third information indicates to the first network element to send a second DNS response message to a terminal device, and the second DNS response message indicates a target application server selected for the terminal device; and
    wherein the second DNS response message is the first DNS response message.

5. The method according to claim 1, further comprising:
    sending, by the session management network element, second information to the first network element, wherein the second information indicates access information of a terminal device, the access information of the terminal device is used by the first network element to select the application server for the terminal device, and the information about the application server is comprised in the first DNS response message.

6. The method according to claim 5, wherein:
the second information further indicates to the first network element to send a DNS request message to a DNS server that matches the access information of the terminal device; or
the second information further indicates to the first network element to add the access information of the terminal device to the DNS request message.

7. The method according to claim 6, wherein the access information of the terminal device is:
a data network access identifier (DNAI) corresponding to a data network that is able to be accessed by the terminal device.

8. The method according to claim 7, further comprising:
obtaining, by the session management network element from an application function, a correspondence between the DNAI and an address range where the report message will be sent.

9. The method according to claim 1, wherein inserting, by the session management network element, the local session anchor based on the report message comprises:
determining, by the session management network element based on the information about the application server, a data network access identifier (DNAI) of the data network in which the application server is located, to determine the to-be-inserted local session anchor.

10. The method according to claim 1, further comprising:
determining, by the session management network element, based on at least one of a data network name (DNN) or single-network slice selection assistance information (S-NSSAI) that correspond to a session, and information about a user plane network element selected for the session, the first network element corresponding to the session from a plurality of first network elements.

11. The method according to claim 10, further comprising:
sending, by the session management network element, at least one of the first information or second information to the first network element corresponding to the session; and
sending, by the session management network element to a terminal device, an address of the first network element as an address of a DNS server.

12. A method, comprising:
receiving, by a first network element, first information from a session management network element, wherein the first information indicates to the first network element to send a report message to the session management network element when receiving a first domain name server (DNS) response message that meets a first condition, and the report message comprises information about an application server indicated by the first DNS response message; and
sending, by the first network element, the report message to the session management network element when determining that the received first DNS response message meets the first condition.

13. The method according to claim 12, wherein:
the first information further comprises an address range to use to send the report message, and the first condition is that an internet protocol (IP) address of the application server indicated by the first DNS response message belongs to the address range.

14. The method according to claim 12, wherein the first information further indicates to the first network element to buffer the first DNS response message.

15. The method according to claim 12, further comprising:
receiving, by the first network element, third information from the session management network element, wherein the third information indicates to the first network element to send a second DNS response message to a terminal device; and
sending, by the first network element, the second DNS response message to the terminal device, wherein the second DNS response message indicates a target application server selected for the terminal device, and the second DNS response message is the first DNS response message.

16. The method according to claim 12, further comprising:
receiving, by the first network element, second information from the session management network element, wherein the second information indicates access information of a terminal device, the access information of the terminal device is used by the first network element to select the application server for the terminal device, and the information about the application server is comprised in the first DNS response message.

17. The method according to claim 12, further comprising:
buffering, by the first network element, the first DNS response message when sending the report message to the session management network element.

18. A communication apparatus, comprising a processor coupled to a memory, wherein the processor is configured to invoke a program in the memory, to enable the communication apparatus to:
receive first information from a session management network element, wherein the first information indicates to send a report message to the session management network element when receiving a first domain name server (DNS) response message that meets a first condition, and the report message comprises information about an application server indicated by the first DNS response message; and
send the report message to the session management network element when determining that the received first DNS response message meets the first condition.

19. A communication apparatus, comprising:
a processor coupled to a memory, wherein the processor is configured to invoke a program in the memory, to enable the communication apparatus to:
send first information to a first network element, wherein the first information indicates to the first network element to send a report message to the communication apparatus when receiving a first domain name server (DNS) response message that meets a first condition, and the report message comprises information about an application server indicated by the first DNS response message; and
insert an identifier of a local session anchor to the report message.

20. A non-transitory computer readable storage medium storing a program that is executable by at least one processor, the program including instructions for:
sending first information to a first network element, wherein the first information indicates to the first network element to send a report message to a session management network element when receiving a first domain name server (DNS) response message that meets a first condition, and the report message comprises information about an application server indicated by the first DNS response message; and inserting a local session anchor based on the report message.

21. A non-transitory computer readable storage medium storing a program that is executable by at least one processor, the program including instructions for:

receiving first information from a session management network element, wherein the first information indicates to send a report message to the session management network element when receiving a first domain name server (DNS) response message that meets a first condition, and the report message comprises information about an application server indicated by the first DNS response message; and sending the report message to the session management network element when determining that the received first DNS response message meets the first condition.

* * * * *